(12) United States Patent
Bittner

(10) Patent No.: US 6,331,082 B1
(45) Date of Patent: Dec. 18, 2001

(54) CAMERA WITH COMBINED FILM ADVANCE/REWIND MECHANISM

(75) Inventor: Wilfried Bittner, Tsuen Wan (HK)

(73) Assignee: Concord Camera Corp., Hollywood, FL (US)

( * ) Notice: Subject to any disclaimer, the term of this patent is extended or adjusted under 35 U.S.C. 154(b) by 0 days.

(21) Appl. No.: 09/400,965

(22) Filed: Sep. 22, 1999

(51) Int. Cl.⁷ .............................. G03B 1/00; G03B 19/02
(52) U.S. Cl. .................... 396/413; 396/411; 396/513
(58) Field of Search ................................ 396/387, 411, 396/413, 513, 538

(56) References Cited

U.S. PATENT DOCUMENTS

| | | | | |
|---|---|---|---|---|
| 3,097,809 | * | 7/1963 | Gunther | 396/413 |
| 3,491,957 | | 1/1970 | Sawada et al. | 396/413 |
| 4,994,833 | | 2/1991 | Cocca | 354/207 |
| 5,452,036 | | 9/1995 | Kamata | 354/275 |
| 5,453,808 | | 9/1995 | Zawodny et al. | 354/212 |
| 5,537,176 | | 7/1996 | Hara et al. | 354/288 |
| 5,552,846 | | 9/1996 | Tokui | 354/173.1 |
| 5,555,057 | | 9/1996 | DiRisio | 354/212 |
| 5,576,790 | | 11/1996 | Lamphron et al. | 396/389 X |
| 5,576,793 | | 11/1996 | Hara et al. | 396/6 |
| 5,612,758 | | 3/1997 | Petruchik | 396/413 |
| 5,614,976 | | 3/1997 | Smart et al. | 396/392 |
| 5,614,977 | | 3/1997 | Smart | 396/395 |
| 5,629,750 | | 5/1997 | Smart et al. | 396/538 |
| 5,640,637 | | 6/1997 | Stephenson, III | 396/411 |
| 5,689,733 | | 11/1997 | Zawodny et al. | 396/6 |
| 5,778,269 | * | 7/1998 | Williams | 396/387 |
| 5,843,067 | | 11/1998 | Williams | 396/413 X |
| 6,033,127 | * | 3/2000 | Sakurai | 396/413 |
| 6,059,464 | | 5/2000 | Sakurai | 396/413 |

FOREIGN PATENT DOCUMENTS 30 16 005 A1  4/1980 (DE) .

* cited by examiner

Primary Examiner—Alan A. Mathews
(74) Attorney, Agent, or Firm—Woodcock Washburn Kurtz Mackiewicz & Norris LLP

(57) ABSTRACT

The camera of this invention preferably includes a combined film advance/rewind mechanism for advancing film from a film cassette to a film path and to a film spool and for rewinding film into the cassette after the film has been exposed within the film path. The combined film advance mechanism preferably thrusts film from the film cassette in order to begin the loading process and then pulls the film to wind it around the film spool after the film has been thrusted to the film spool. Preferably, the combined film advance/rewind mechanism is manually operated and can be operated either to advance film or rewind film. Further the combined film advance/rewind mechanism preferably has an interlock that prevents thrusting of the film when the combined film advance/rewind mechanism is in a rewind position and rewinding film the combined film advance/rewind mechanism is in an advance position.

30 Claims, 24 Drawing Sheets

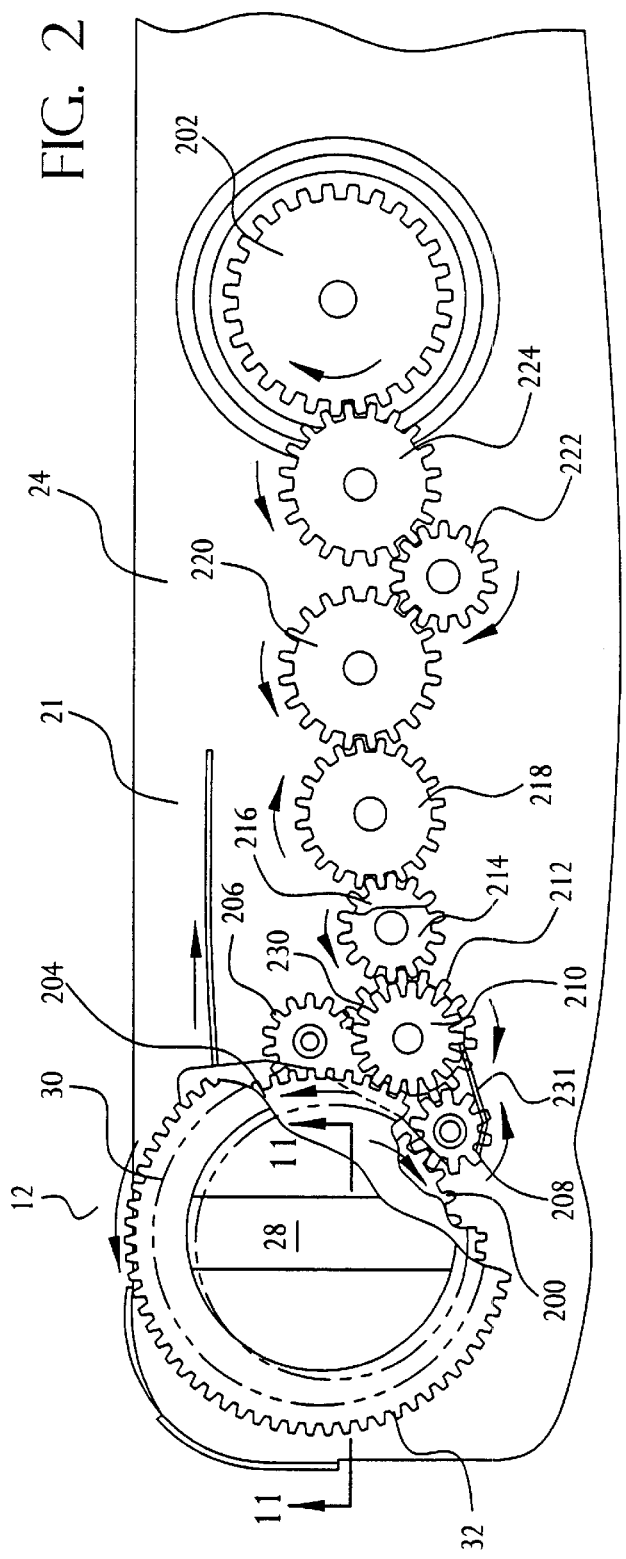

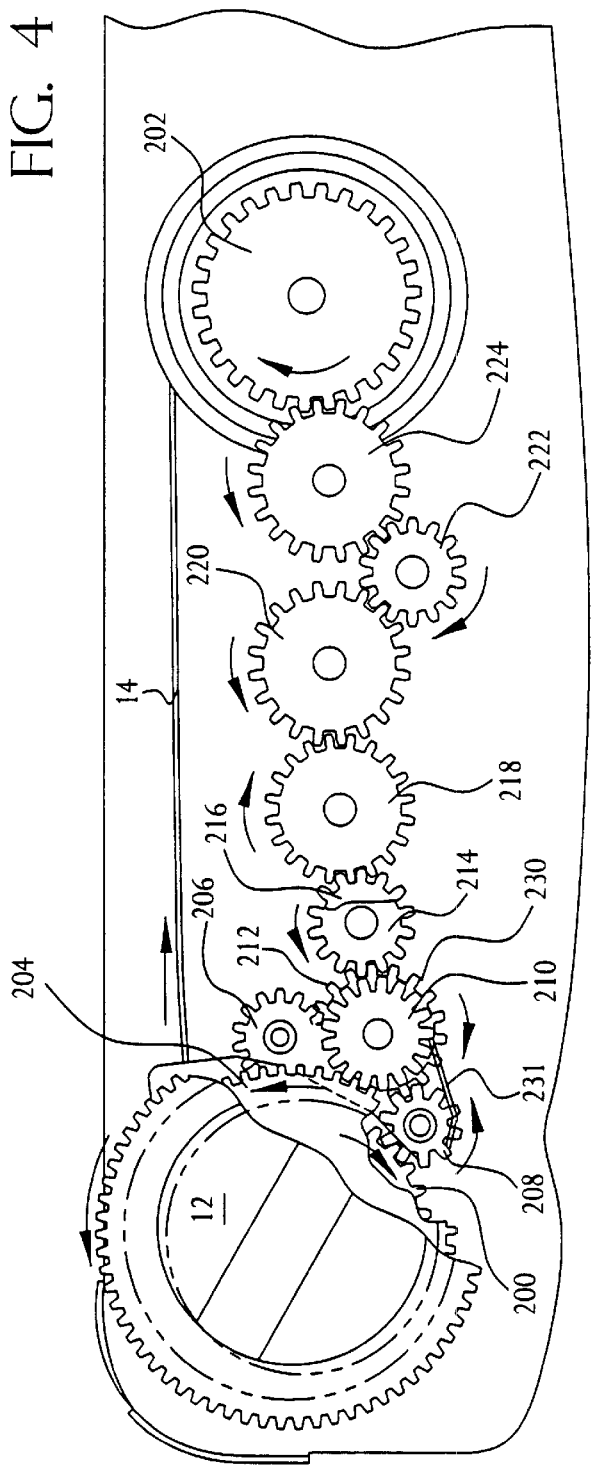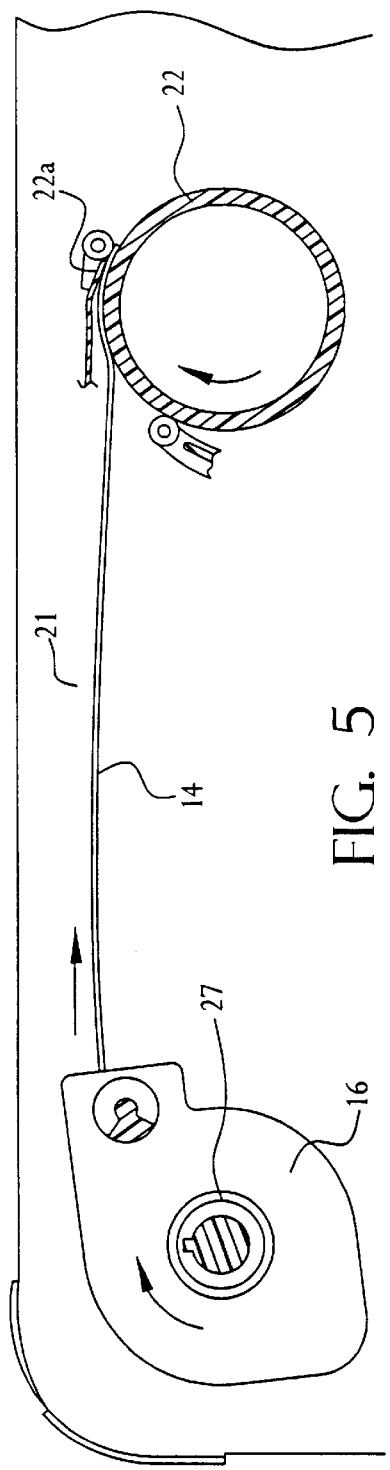

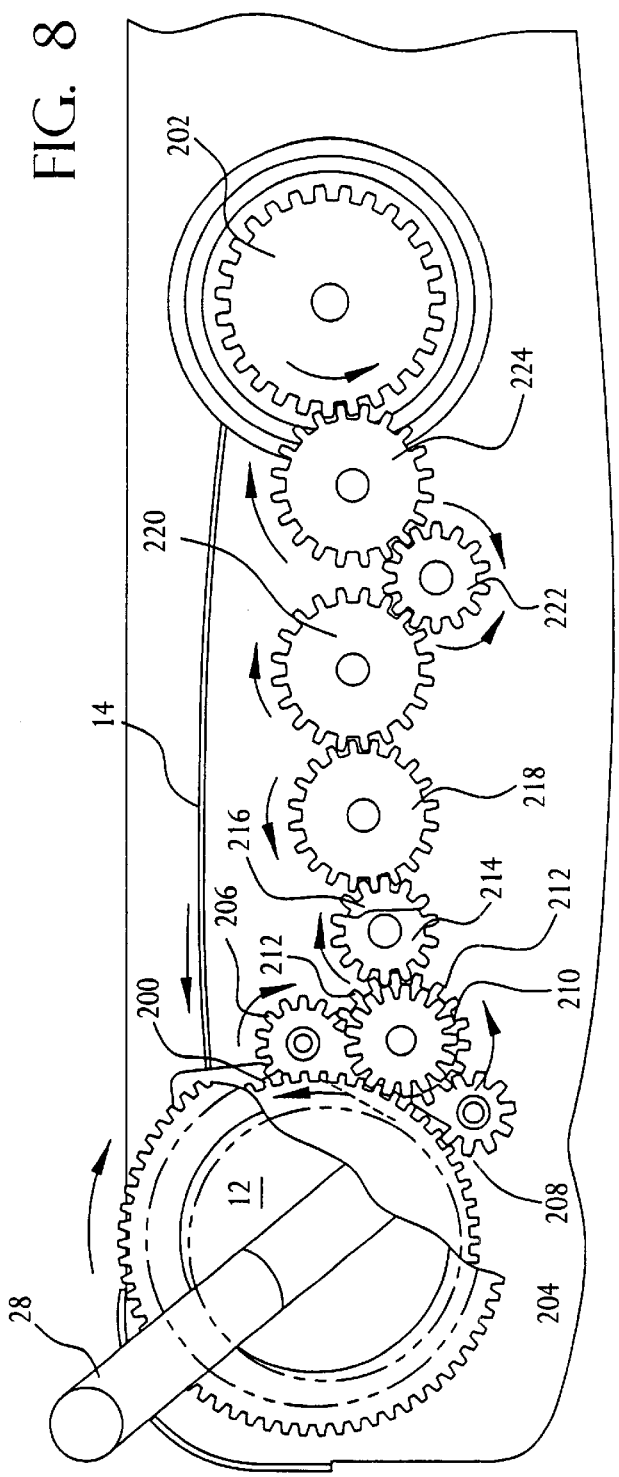
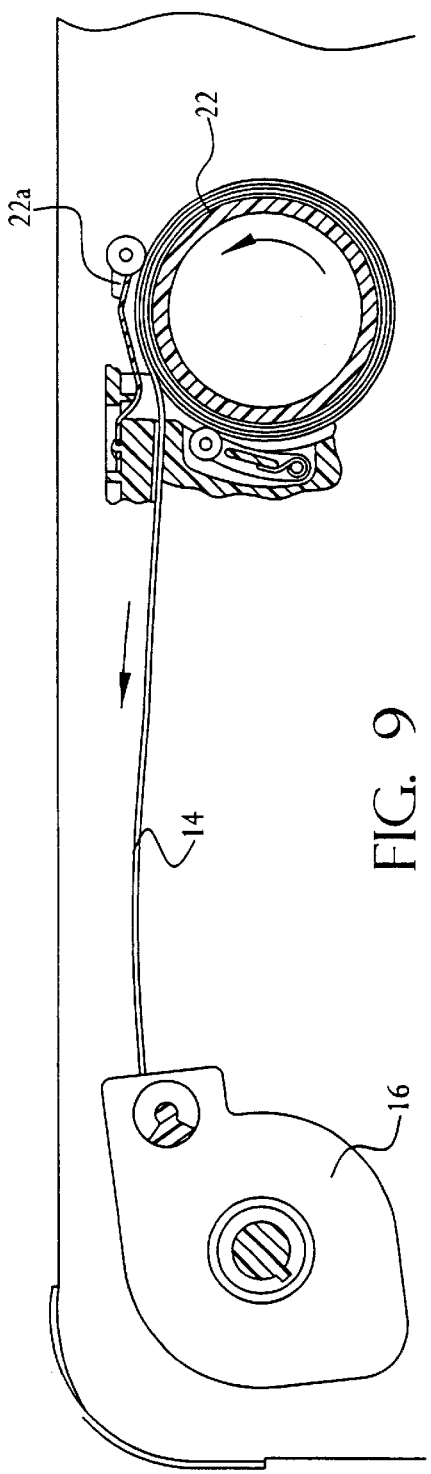
FIG. 8
FIG. 9

FIG. 17F
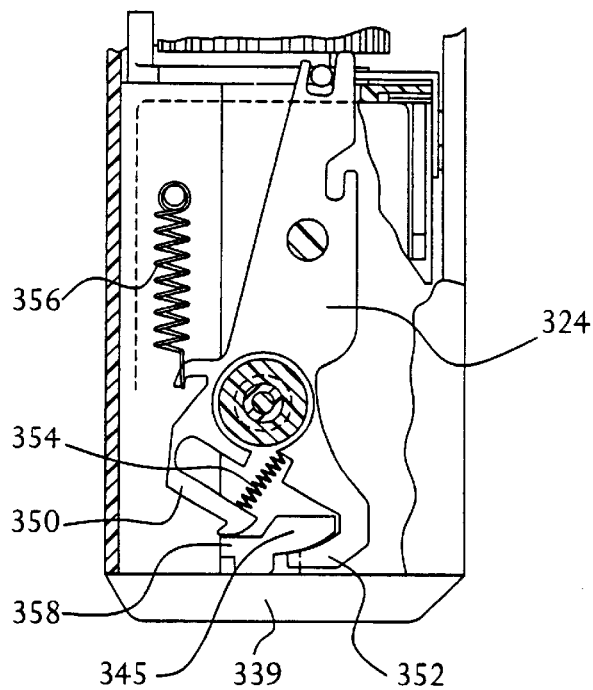
FIG. 17G
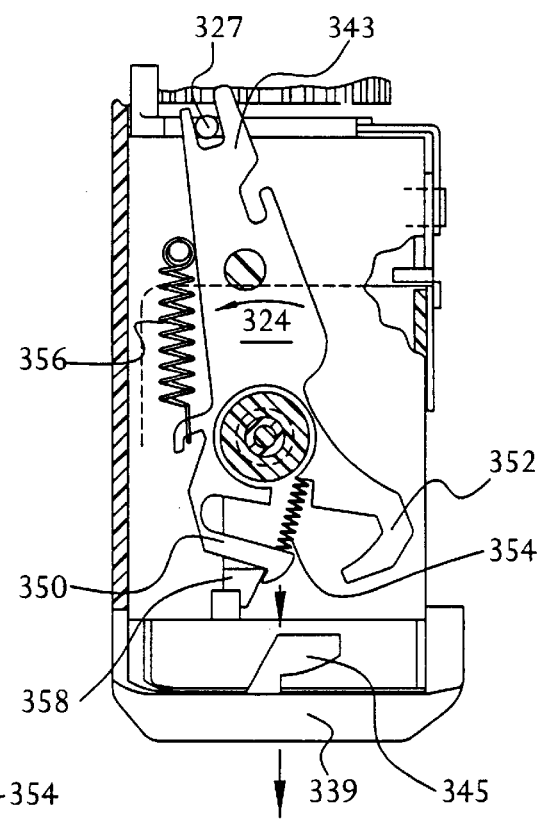
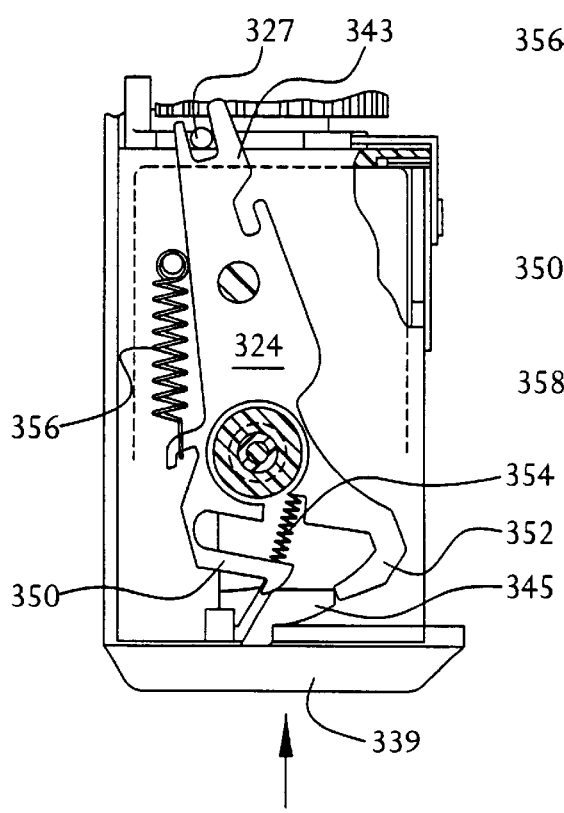
FIG. 17H

CAMERA WITH COMBINED FILM ADVANCE/REWIND MECHANISM

BACKGROUND OF THE INVENTION

The camera of this invention perferably includes an improved combined film advance/rewind mechanism for advancing film from a film cassette and rewinding film into a film cassette. Preferably, the camera of this invention is a manual Advanced Photo System (APS) reusable camera. This application contains subject matter that is related to commonly assigned co-pending patent application Ser. No. 09/400,951 entitled "Rewind Interlock For APS Camera," which is hereby incorporated by reference.

Cameras typically have a film cassette compartment for receiving a film cassette, a film spool and a film path. The film spool is generally rotatably mounted to the camera and disposed in a film spool compartment on a side of the camera opposite the side that the film cassette compartment is disposed. The film path is defined by the region between the film cassette compartment and the film spool compartment and typically includes the film exposing area. Once a film cassette is loaded into the camera, film is typically loaded by moving the film out of the film cassette, and along the film path, and then winding the film around the film spool. As exposures are taken, the film is then moved from the film spool and the film path back into the film cassette.

In order to load film around the film spool, motorized 35 mm. cameras typically have a motor that rotates the film spool to pull the film out of the film cassette, draw it across the film path and wind it around the film spool. Before loading the film, an exposed film leader extending from the 35 mm. film cassette has to be manually wrapped around the film spool. In order to rewind the film back into the film cassette after exposures are taken, the same motor or another motor rotates a spindle of the film cassette to pull the film back into the film cassette.

Relatively recently, Advanced Photo System (APS) film has been developed. An APS film cassette does not have an exposed film leader, but rather has a light lock door for light sealing the film within the cassette. APS film is thinner than conventional 35 mm. film and unlike 35 mm. can be thrust from a cassette. In fact, APS film must be thrust from the cassette in order to initially move the film out of the cassette because it does not have an exposed film leader. In order to load APS film, the light lock door of the film cassette is opened and the film is thrust from the cassette by rotating a spindle of the film cassette. In one type of APS camera the film is loaded around the film spool prior to exposing the film. This includes thrusting the film across a film exposure area and around a film spool. In order to complete the loading process, the film is wound around the film spool. After loading is complete the first frame to be exposed rests in the film exposing area and the other frames are wrapped around the film spool. After exposure of a frame, the exposed frame is moved into the film cassette and the next frame to be exposed is moved from the film spool to the film exposing area.

Other types of APS cameras do not "load" film as described above. Rather, in these other APS cameras the first frame of film is advanced from the cassette to the film exposing area. After exposure of this frame, the exposed frame is moved to the film spool and the next frame to be exposed is moved from the film cassette to the film exposing area. This process continues until all of the exposures have been taken. After which, the film is moved from the film spool across the film exposing area and back into the film cassette.

In motorized APS cameras, a motor may be used to rotate the spindle of the film cassette and thrust the APS film from the cassette. Once the APS film has begun winding around the film spool, the film spool may be rotated by the same motor or a separate motor to completely wind the film around the film spool, It will be appreciated that since 35 mm. cameras do not thrust film and APS cameras need to thrust film out of the film cassette, mechanisms have to be developed to thrust APS film. Further, in manual type APS cameras, non-motorized mechanisms need to be developed to thrust APS film. This invention relates to an improved camera for thrusting APS film from and rewinding APS film into an APS film cassette that has a light lock door. This invention also relates to a camera that has an interlock that prevents a camera user from thrusting film from the film cassette, when film is to be rewound and rewinding film into the film cassette, when film is to be thrusted.

SUMMARY OF THE INVENTION

The camera of this invention is preferably a manual reusable APS camera. However, it need not be this type of camera and features of this invention may be employed with other types of cameras. The camera of this invention may have a combined advance/rewind mechanism for advancing or thrusting film out of a film cassette and for winding film back into the film cassette. Further, the camera of this invention preferably includes a film cassette compartment, a film path and a film spool. The film cassette compartment defines an area within the camera for receiving a film cassette. Preferably, the film cassette compartment may receive an APS film cassette. The film spool is rotatably mounted to the camera, so that film from the film cassette may be wound around the film spool. Disposed between the film cassette compartment and the film spool is the film path. The film path also defines an exposure area in which the film is exposed to create images on the film.

In one embodiment, after a film cassette is loaded into the camera, the leading edge of the film is moved from the film cassette along the film path and to the film spool, and the first frame of film is disposed within the film exposing area. After the first frame of film is exposed, that frame is advanced to the film spool and the next frame is advanced to the film exposing area. Operation of the camera continues in this fashion until all of the desired exposures are taken. After the film has been exposed and it is desired to remove the film cassette from the camera, the film is rewound into the film cassette by moving the film from the film spool along the film path and back into the film cassette.

The combined advance rewind mechanism is rotatably mounted to the camera and may be coupled to a spindle of the film cassette. When rotated in a first direction, the combined film advance/rewind mechanism thrusts film out of the film cassette by rotating the film cassette spindle. The combined advance/rewind mechanism may also rotate the film spool when it is rotated in the first direction to pull film around the film spool after the film has been thrusted to the film spool. In comparison, when the combined advance/rewind mechanism is rotated in a second direction, the film cassette spindle is rotated in a second direction to wind film into the cassette and around the spindle of the cassette. A gear train may also be included within the camera that couples the combined film advance/rewind mechanism to the spindle of the film cassette and to the film spool.

In order to load the film, the combined film advance/rewind mechanism is rotated in the first direction to rotate the spindle of the film cassette and to rotate the film spool. The rotation of the spindle causes the leading edge of the film to be thrust out of the film cassette and into the film path. As, the film enters the film path, the leading edge of the film crosses the film path and reaches the film spool, which is also rotating due to the rotation of the combined film advance/rewind mechanism. Rotation of the film spool pulls or winds the film around the film spool. Further rotation of the combined advance/rewind mechanism in the first direction winds the leading edge of the film onto the film spool. After each frame of film is exposed in the film exposing area, the film spool is rotated to pull the exposed frame of film around the film spool and to advance the next frame of film to be developed to the film exposing area.

After the pictures have been taken with the camera, the combined film advance/rewind mechanism is rotated in a second or rewind direction. In this direction, the gear train couples the combined film advance and rewind mechanism to the spindle of the film cassette, but not the film spool. Thus, rotation of the film advance and rewind mechanism rotates the film spindle in a second direction to pull or rewind the film back into the film cassette.

The combined film advance/rewind mechanism may further include an interlock that prevents movement of film either out of or into the film cassette when it is not desired to do so. This interlock prevents rotation of the combined film advance/rewind mechanism in the second or rewind direction when the interlock is in a first position. The interlock may also prevent rotation of the combined film advance/rewind mechanism in the first or advance direction to rewind film when the interlock is in the second position. Thus, this interlock prevents movement of the film in a direction opposite to that desired.

In a preferred embodiment the interlock includes a retractable rewind crank that has a first position and a second position. When the rewind crank is fully rotated into its first position, the rewind crank fits within a groove of the combined film advance/rewind mechanism. The interlock may further include a spring mechanism and a slidable plate. This slidable plate is moved by the rotation of the retractable rewind crank between a first position and a second position. In its first position, a slidable plate prevents movement of the combined film advance and rewind mechanism in the second direction and in its second position a slidable plate prevents movement of the combined film advance and rewind mechanism in its first direction.

The spring mechanism is preferably mounted to the combined film advance and rewind mechanism, so that it rotates with the combined film advance/rewind mechanism. The spring mechanism is engageble with a stationary support that is rigidly mounted to the camera to prevent rotation of the combined advance/rewind mechanism in either or both the first and the second direction depending on the position of the slideable plate. When the rewind crank and the slideable plate are in their respective first positions, the spring mechanism engages the stationary support to prevent rotation of the combined advance/rewind mechanism in its second or rewind direction. Movement of the rewind crank to its second position causes the slideable plate to move to its second position. The spring mechanism responds to movement of the slideable plate to engage the stationary support to prevent movement of the combined advance/rewind mechanism in its first direction. In addition, the spring mechanism responds to this movement of the slideable plate to disengage the stationary support to permit rotation of the combined advance/rewind mechanism in the second rewind direction.

If the rewind crank is rotated to a third position, which includes any rotational position between its first and second positions, the slideable plate will move to disengage with the spring mechanism. Once disengaged, the spring mechanism will engage the stationary support to prevent rotation of the combined advance/rewind mechanism in both the first and the second directions.

Thus, in order to advance film from the film cassette to the film spool, the rewind crank must be in the first position. Likewise, the rewind crank must be in the second position in order to rewind the film. Therefore, a camera user is prevented from moving film in the wrong direction and cannot move the film in the proper direction unless the rewind crank is positioned properly.

As alluded to above, the camera of this invention preferably includes a gear train that couples the combined film advance/rewind mechanism to either or both the film cassette and the film spool. Preferably, the combined film advance/rewind mechanism is manually operated and the gear train transmits its driving force to either or both the spindle of the film cassette or the film spool. If the combined film/rewind mechanism is rotated in its first direction, the gear train couples the combined film advance/rewind mechanism to the spindle of the film cassette and to the film spool. When the film is to be loaded onto the film spool, the combined film advance/rewind mechanism is rotated in its first direction to thrust film out the film cassette into the film path and around the film spool.

The film will be thrust from the film cassette until it is relatively taught within the film path. Once it is relatively taught, the gear train will disconnect the combined advance/rewind mechanism from the spindle of the film cassette. At this point, the combined advance/rewind mechanism will be coupled to the film spool, so that the film spool will rotate to pull film around the film spool when the combined advance/rewind mechanism is rotated in the first direction. This occurs because as is explained below, further rotation of the advance/rewind mechanism causes the spindle of the film cassette to become disengaged from the advance/rewind mechanism. This occurs because a portion of the gear train operates as a clutch and disconnects the mechanism from the spindle after the film begins to be wrapped around the film spool. Thus, further rotation of the advance/rewind mechanism rotates the film spool, but not the spindle of the film cassette, to pull film from the cassette to the film spool. In summary, film is moved from the cassette by first thrusting the film from the cassette and then pulling film from the cassette once the film is sufficiently taught within the film path.

After an exposure has been taken and film is to be rewound into the film cassette, the combined film advance/rewind mechanism may be rotated in its second direction. When rotated in the second direction, the gear train decouples the combined film advance/rewind mechanism from the film spool. Therefore, rotation of the combined film advance/rewind mechanism will rotate only the spindle of the film cassette to pull and rewind film back into the film cassette. In order to decouple the combined film advance/rewind mechanism from the film spool when the combined film advance/rewind mechanism is rotated into the second direction, one of the gears of the gear train may be pivotably mounted on a pivot plate. Because it is pivotably mounted, rotation of the gear train, due to rotation of the combined film advance/rewind mechanism in the second direction, will push the pivotably mounted gear out of engagement with at least one of the other gears of the gear train. Once this pivotably mounted gear is out of engagement, the combined film advance/rewind mechanism is no longer coupled to the film spool and rotation of the combined film advance/rewind mechanism is not transmitted to the film spool.

The camera of this invention may further include a rewind interlock that prevents double exposure of the film by advancing exposed film from the film cassette back into the film exposing area after the exposed film has been rewound into the film cassette. Because APS film can be thrust and is thrusted out of the film cassette, the potential exists that exposed rewound film can be thrust out of the film cassette and exposed again. If this occurs, a picture may be accidently destroyed. In order to prevent this occurrence, the camera of this invention may have a rewind interlock.

The rewind interlock may include a rotatable pawl, a rotatable interlock lever and a rotatable wheel that is coupled to a film moving mechanism. The wheel may be part of the combined advance/rewind mechanism described above or a wheel that is coupled to any of a variety of film advance and rewind mechanisms. The wheel rotates in an advance direction when film is moved from the cassette to the film spool, and a rewind direction when the film is moved from the film spool to the film cassette.

Disposed on an inner periphery of the wheel may be a notch, and disposed within a cavity defined by the inner periphery of the wheel may be the pawl. The pawl is preferably spring biased to rotate towards the inner periphery. The interlock lever is preferably rotatably mounted to the camera, and the pawl is rotatably mounted to the interlock lever, so that the pawl can rotate with the interlock lever and relative to the interlock lever. One end of the pawl may be angled for interaction with the notch to define the interlock.

The pawl and the interlock lever preferably have a first position in which the pawl is disposed against the inner periphery of the wheel. While in the first position, the wheel can rotate in the advance direction and except when the notch contacts the pawl, the inner periphery of the wheel slides against the pawl as the wheel rotates. When the notch on the wheel engages the pawl, as the wheel is rotated in the advance direction, the notch pushes the pawl to rotate against the bias of the spring to permit the notch to be rotated past the pawl. Once the notch rotates past the pawl, the pawl is released and again rests against the inner periphery.

In order to define the interlock, the wheel is rotated in the rewind direction. As the wheel is rotated in the rewind direction, film is being moved back into the film cassette. The inner periphery of the wheel slides along the pawl, until the notch contacts the pawl. Upon contacting the pawl in the rewind direction, the notch causes the pawl to rotate against the bias of the spring in a direction opposite to that which it rotates when the wheel is rotated in the advance direction. Once the notch rotates past the pawl in the rewind direction, the pawl is released and the spring causes the pawl to rotate to contact the inner periphery of the wheel. However, the pawl contacts the inner periphery in a second position, which is a rotated position relative to its first position. In this second position, an angled end of the pawl is disposed so that the notch cannot be rotated past the angled end when the wheel is rotated in the advance direction and the interlock is defined. In contrast, the wheel can still be rotated in the rewind direction because the notch can push the pawl to rotate out of its path when the wheel is rotated in the rewind direction.

If the wheel is rotated in the advance direction with the pawl in the second position, the notch will contact the angled end of the pawl and become jammed, so that the wheel and the mechanism for moving the film cannot be manipulated further to move film from the film cassette and toward the film spool. The wheel can still be rotated in the rewind direction to rewind the film into the cassette. Since the interlock is created by rotating the wheel in the rewind direction, the interlock prevents advancing film after the film has been rewound and thereby prevents exposing the film twice.

In order to reset the rewind interlock, the camera may have a slide that is coupled to the door that covers the film cassette compartment. Closing and opening of the door moves the slide because the slide is mechanically coupled to the door. As the glide moves, it either moves or releases the spring biased interlock lever to rotate. After the film has been rewound, the door of the film cassette compartment can be opened to remove the film cassette. Opening of this door, moves the slide to releases interlock lever to rotate due to the bias of the spring. When the interlock lever rotates, the attached pawl rotates with it away from the inner periphery of the wheel. As the pawl rotates with the interlock lever, the pawl also rotates relative to the interlock lever to a reset position.

After a new film cassette is inserted into the film cassette compartment the film cassette compartment door is closed. Closing of the door of the film cassette compartment moves the slide to push the interlock lever against the bias of the spring to cause the interlock lever to rotate. Since the pawl is mounted to the interlock lever, the pawl rotates with the interlock lever to move the interlock lever to the first position, where the wheel can be rotated in the advance direction.

Other features of this invention are provided below.

BRIEF DESCRIPTION OF THE DRAWINGS

FIG. 2 is a diagrammatical top view of the preferred embodiment of FIG. 1 depicting the film being thrust out of the film cassette and into the film path;

FIG. 3 is a cross-section taken along line 3—3 of FIG. 1;

FIG. 4 is a diagrammatical top view of the preferred embodiment of FIG. 1 depicting the film being advanced from the film cassette to the film spool;

FIG. 5 is a diagrammatical top view of the preferred embodiment of FIG. 1 depicting the film cassette and the film spool as the film is being advanced from the film cassette to the film spool;

FIG. 8 is a diagrammatical top view of the preferred embodiment of FIG. 1 depicting the film being rewound from the film spool to the film cassette;

FIG. 9 is a diagrammatical top view of the preferred embodiment of FIG. 1 depicting the film cassette and the film spool as the film is being rewound from the film spool to the film cassette;

FIG. 17F is a diagrammatical end view of the embodiment of FIG. 1 with the film cassette compartment door closed;

FIG. 17G is a diagrammatical end view of the embodiment of FIG. 1 with the film cassette compartment door being opened;

FIG. 17H is a diagrammatical end view of the embodiment of FIG. 1 with the film cassette compartment door being closed;

DETAILED DESCRIPTION OF PREFERRED EMBODIMENTS

The camera 10 of this invention preferably has a combined film advance and rewind mechanism 12 that may be used to advance or thrust film 14 from a film cassette 16 and rewind film 14 into the film cassette 16. Preferably, the camera 10 of this invention is an Advanced Photo System (APS) camera of the type that employs APS film 14 contained within an APS film cassette 16 that has a light lock door. However, various features of this invention may be employed with cameras that do not use APS film. In a preferred embodiment of this invention, the camera 10 may be a manual camera that does not employ a motor to move the film 14 into and out of a film cassette 16, but rather has a manually operated combined advance/rewind mechanism 12 within the camera 10 for moving the film 14.

Further, the camera 10 is preferably a reusable APS camera 10. A reusable camera is intended to be reloaded with a film cassette after the film from one cassette has been exposed. A film cassette can be removed from a reusable camera and delivered to a film developer without at least partially destroying the camera. However, some features of this invention may be employed with a single-use APS camera 10. A single-use camera is one that is purchased with a film cassette 16 loaded into the camera 10 and the film 14 loaded, so that the camera 10 is ready for picture taking. Single-use cameras are intended to be given to a film developer for removing the film cassette 16 and developing the film 14; they are not intended to be reloaded with film 14 by the camera purchaser.

By way of overview, the camera 10 of this invention includes a combined advance/rewind mechanism 12 for manually thrusting film 14 from a film cartridge to load the film 14 and for manually pulling the film 14 to rewind the film 14 into the film cassette 16 after an exposure has been taken. Two embodiments of the combined advance/rewind mechanism are described below. FIGS. 1–9 illustrate a film 14 loading sequence and a rewinding sequence with both of the embodiments of the combined advance/rewind mechanism of this invention. A first preferred embodiment of the combined advance/rewind mechanism 12 is illustrated in FIGS. 10–17, and FIGS. 25–31 illustrate a second preferred embodiment of the combined advance/rewind mechanism 12.

The camera of this invention may also include a rewind interlock, an embodiment of which is depicted in FIGS. 16–24. The rewind interlock prevents double exposure of the film. As described in more detail below, in the embodiment shown, the rewind interlock prevents advancing film and then exposing it after it has been exposed and rewound into the film cassette.

Figure 1:
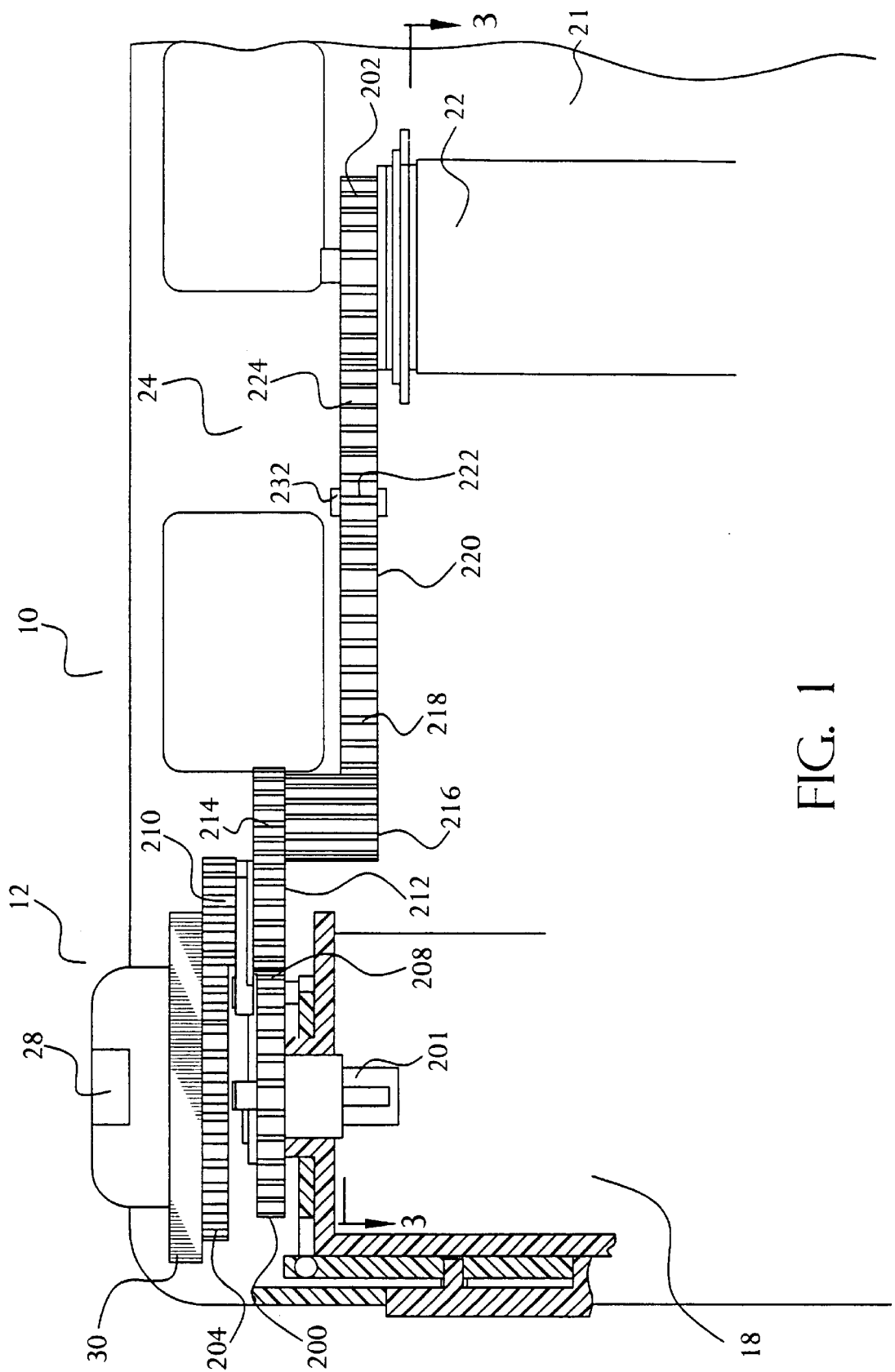
FIG. 1 is a diagrammatical side view of a camera according to a preferred embodiment of this invention.

Both embodiments of the camera 10 of this invention may have a film cassette compartment 18 for receiving a film cassette 16 and a film spool compartment 20, as shown diagrammatically in FIG. 1. Rotatably mounted within the film spool compartment 20 is a film spool 22 onto which film 14 from a film cassette 16 may be wound. The film spool 22 may have a rubber sleeve mounted about its exterior. A film path 21, shown diagrammatically in FIG. 2, may be defined between the film cassette compartment 18 and the film spool compartment 20. Film 14 travels along the film path 21 between the film cassette compartment 18 and the film spool compartment 20. Exposure of the film 14 occurs while it is in the film path 21.

In a preferred embodiment, the camera 10 includes a combined film advance rewind mechanism 12, a gear train 24 and a film interlock 26. The gear train 24 is best illustrated in FIGS. 1–9. The function of the gear train 24 is to couple the combined advance/rewind mechanism 12 to the film spool 22 and/or the spindle 27 of the film cassette, so that manipulation of the combined advance/rewind mechanism 12 will drive the film spool 22 and/or the spindle of the film cassette 16 to rotate at a desired speed to either advance or rewind the film. Although a variety of gear trains 24 may be used to couple the combined advance/rewind mechanism 12 to the film spool 22, a preferred embodiment is illustrated in FIGS. 1–9 and described in detail below.

By way of overview, with the camera 10 of this invention an APS film cassette 16 may be light sealed within the camera 10 and the light lock door 23 of the film cassette 16, shown diagrammatically in FIG. 3, may be opened. Following this, the film 14 may be manually thrust out of the film cassette 16 and into the film path, as shown diagrammatically in FIGS. 2 and 3, with the combined film advance/rewind mechanism 12. The film may be further thrust until the leading edge of the film reaches the film spool, as shown diagrammatically in FIGS. 4 and 5. As is explained below, once the leading edge of the film begins to be wrapped around the film spool, the film is advanced from the film cassette to the film spool by either the rotation of the film spool which is driven by the combined advance/rewind mechanism or by the rotation of the film cassette spindle.

In the embodiment shown, the leading edge of the film is advanced to the film spool and the first frame of film is advanced to the film exposing area. After this, pictures are taken and the frame of exposed film is advanced to the film spool and the next frame is advanced from the film cassette to the film exposing area. This process continues until all of the desired pictures are taken. As is explained below, the combined advance/rewind mechanism 12 may be used to manually drive the film spool 22 to pull the film 14 from the film cassette 16 and wind the film 14 around the film spool 22, as depicted in FIGS. 4–7 after each exposure.

In order to rewind the film 14 into the film cassette after the desired number of pictures have been taken, the combined advance/rewind mechanism 12 is manipulated to rotate the spindle of the film cassette 16 and pull the film 14 into the film cassette 16, as shown in FIG. 8.

A description of the gear train 24 and two embodiments of the combined advance/rewind mechanism 12 is provided below. A description of the film loading sequence and the rewinding of film into the film cassette after the film has been exposed is also provided. Further, a description of the rewind interlock that may be used with or without either of the embodiments is also provided.

First Emdodiment of the Combined Advance/ Rewind Mechanism

Figure 15:
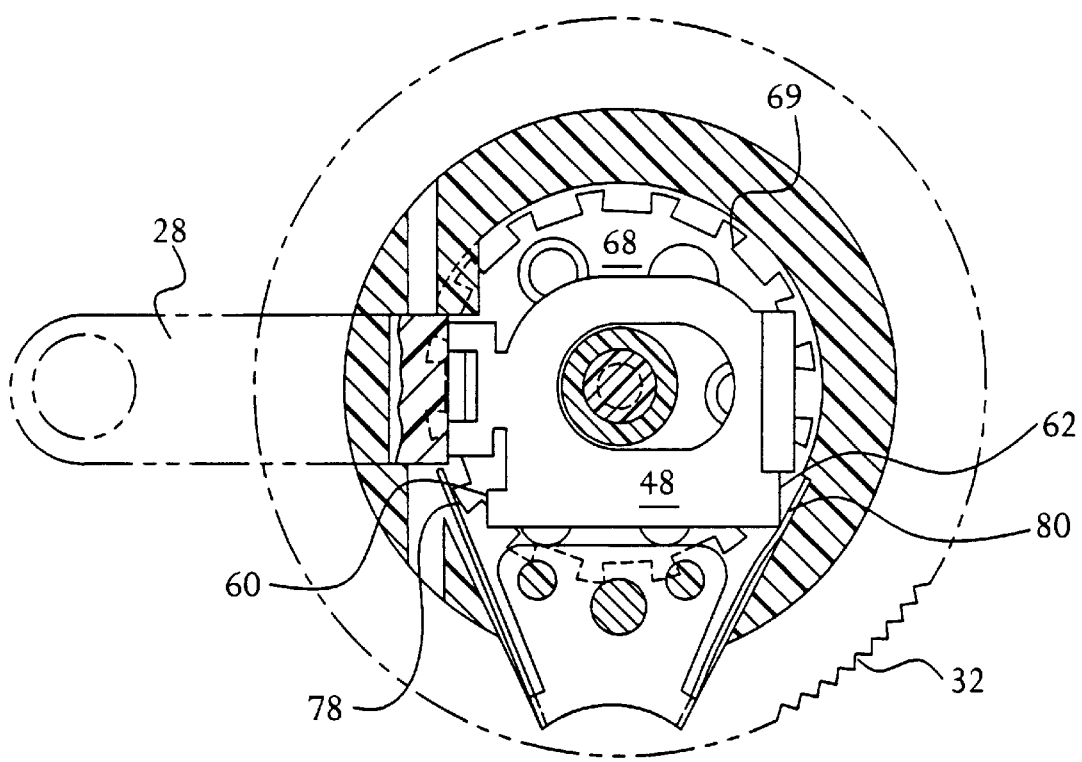
FIG. 15 is a cross-section taken along line 15—15 of FIG. 14.
Figure 16:
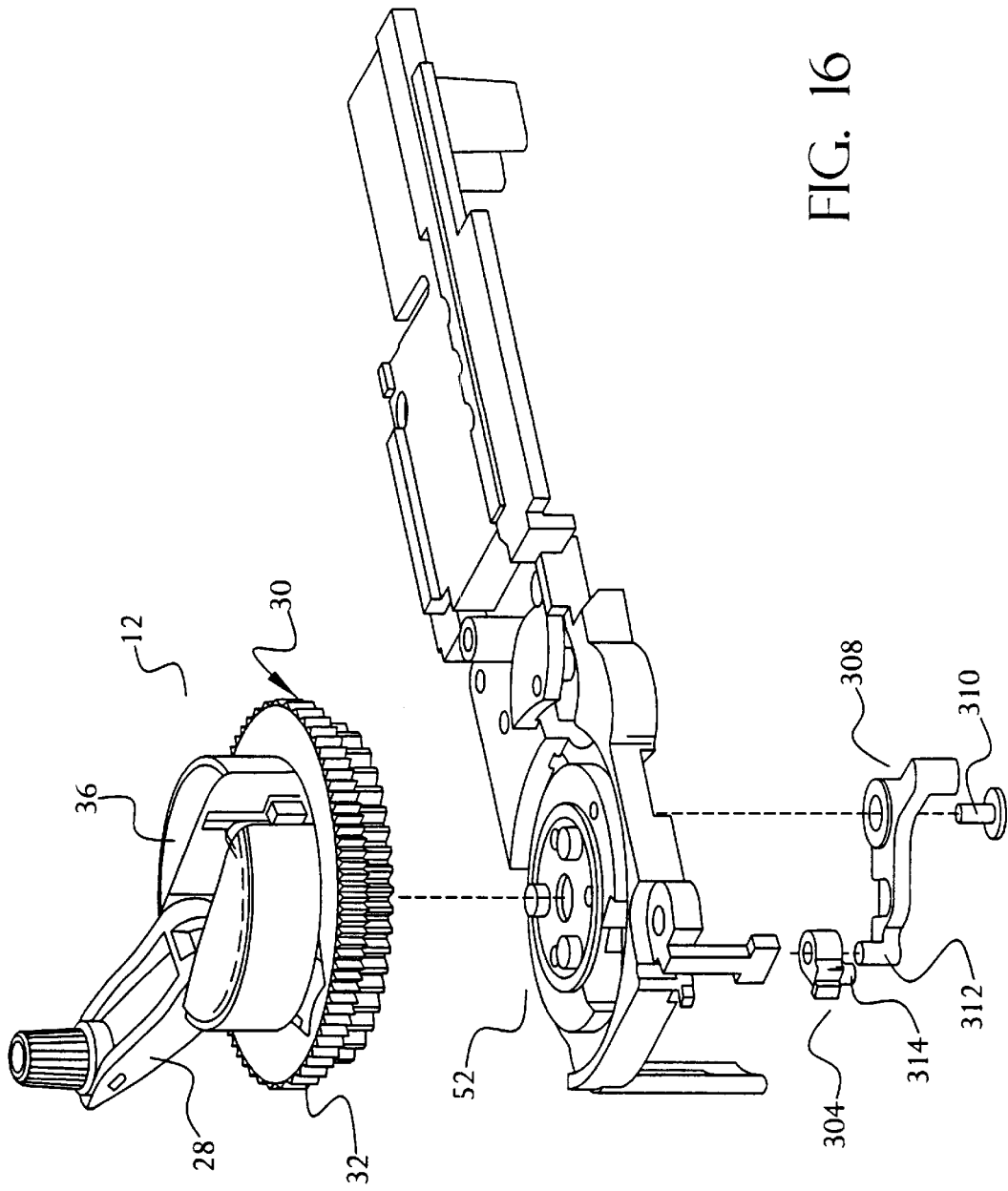
FIG. 16 is a top view assembly drawing of the embodiment of FIG. 10 being assembled to a camera and a rewind interlock according to a preferred embodiment of this invention.
Figure 17:
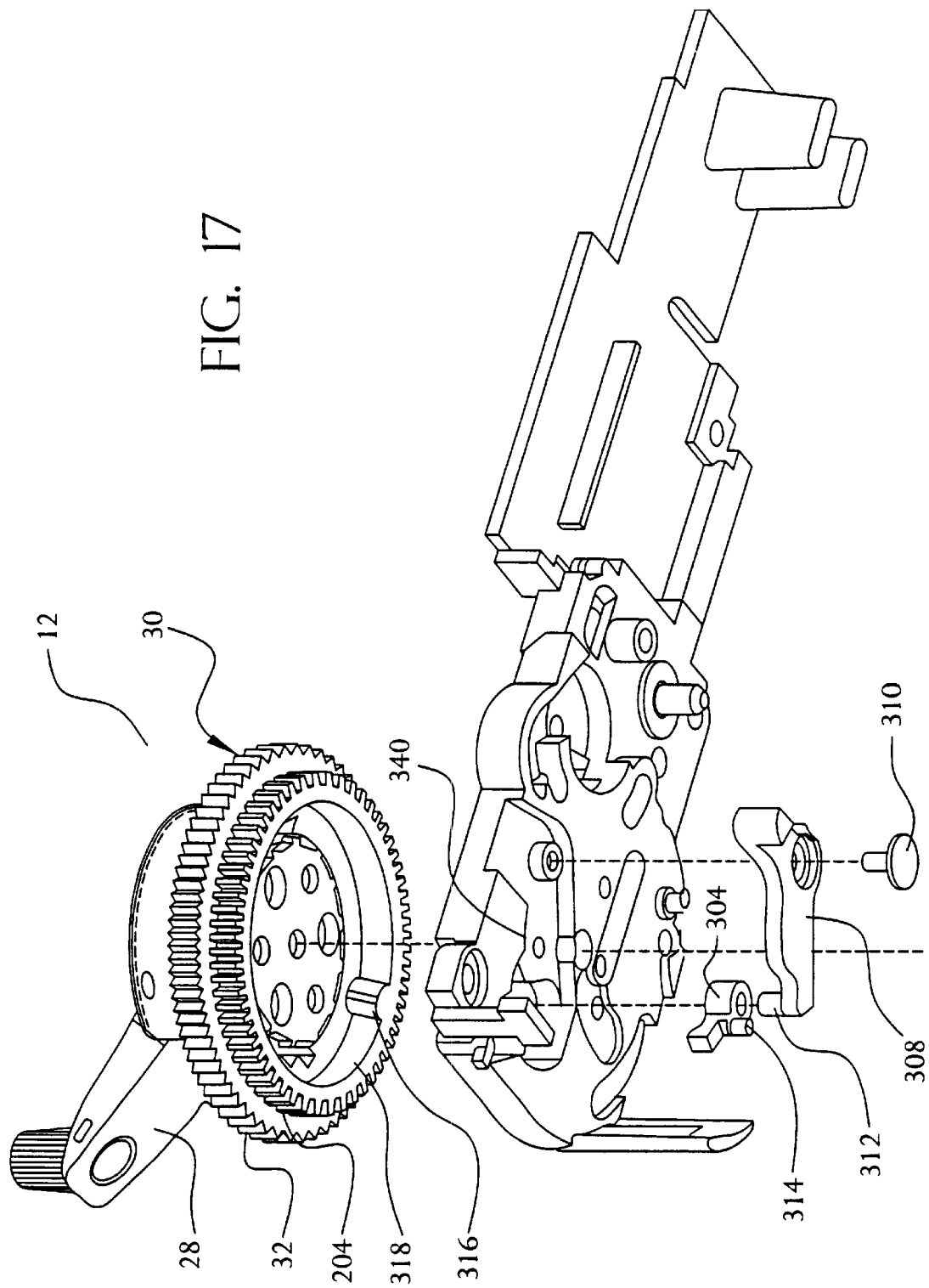
FIGS. 17 and 17A are assembly drawings of the embodiment of FIG. 10 and the rewind interlock of FIG. 16.

As alluded to above, FIGS. 10–17 depict a first preferred embodiment of a combined advance/rewind mechanism 12 of this invention. The combined advance/rewind mechanism of this invention enables the film to be advanced and rewound with the same mechanism. The combined advance/rewind mechanism 12 includes an interlock 26, a rewind crank 28 and an advance wheel 30. The advance wheel 30 is rotatably mounted to the camera 10 and includes a segmented portion 32 for engagement by a camera user's thumb, as best shown in FIG. 17. Because of this, the advance wheel 30 may be referred to as a "thumb wheel." As described below depending upon the position of the rewind crank 28, the thumb wheel can be rotated in either the counter clockwise direction, as shown in FIG. 2, to advance film 14 from the film cassette 16 to the film spool 22, or in the clockwise direction, as viewed in FIG. 8, to rewind film 14 from the film spool 22 into the film cassette 16. In addition to having an advance wheel 30, the combined film advance/rewind mechanism 12 may include a body 34 and a cap 36. In the embodiment illustrated in FIG. 10, the body 34 and the cap 36 are formed integrally from a plastic molding process. The driving gear 204, discussed below, is in this embodiment integrally formed with the combined advance/rewind mechanism, but it need not be integrally formed and may be a separate piece.

Figure 10:
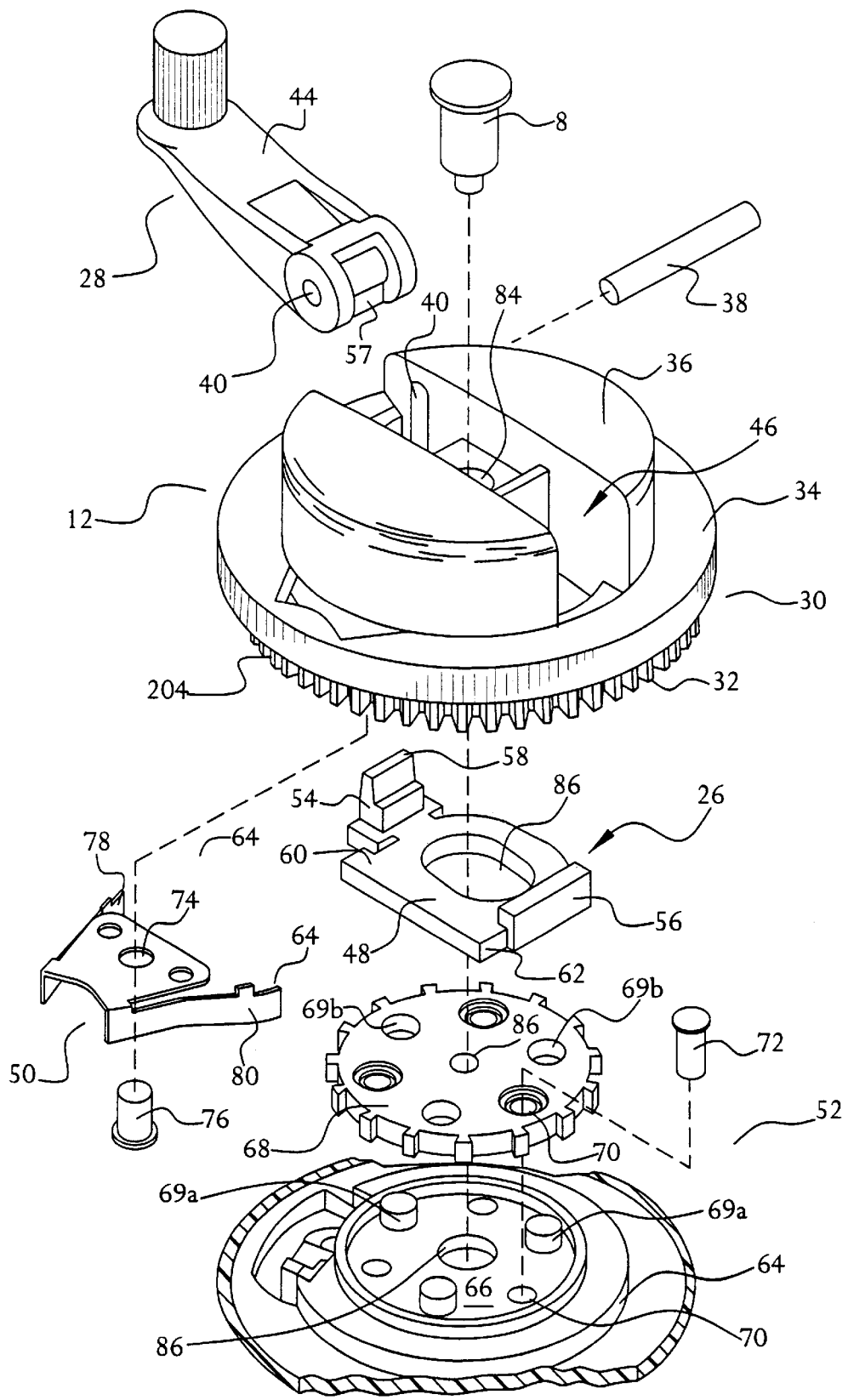
FIG. 10 is an assembly drawing depicting a first preferred embodiment of a combined advance/rewind mechanism.
Figure 12:
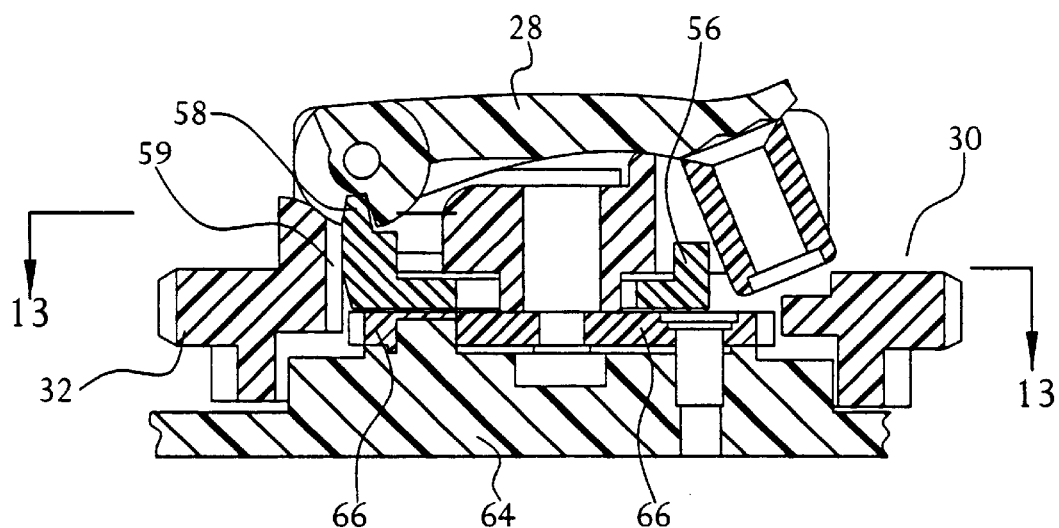
FIG. 12 is a cross-section taken along line 12—12 of FIG. 11.
Figure 14:
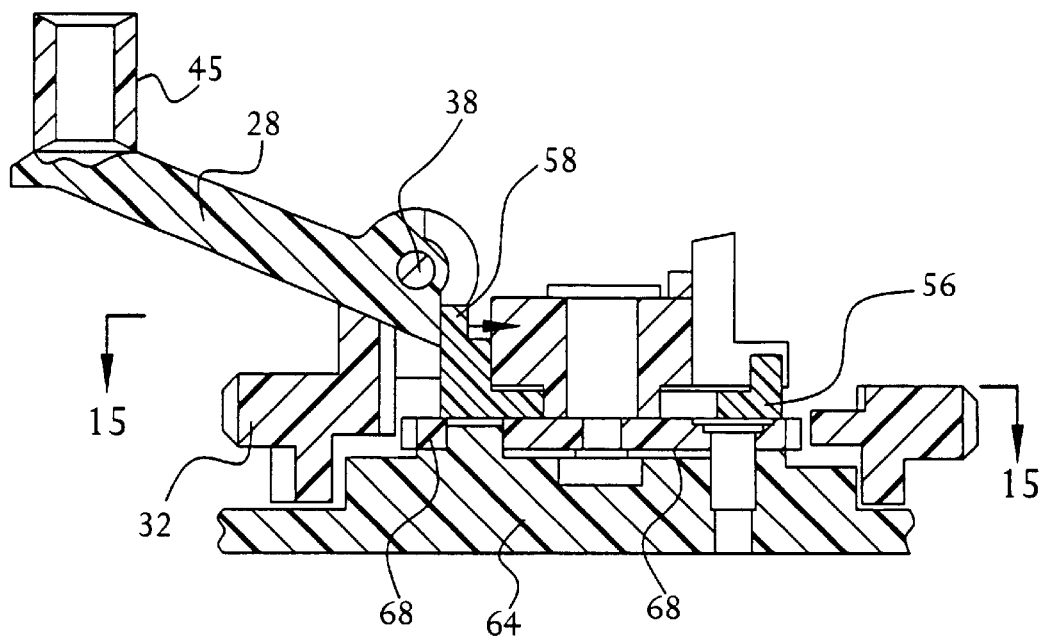
FIG. 14 is a cross sectional view of the preferred embodiment of the combined advance/rewind mechanism of FIG. 10 in a second position.
Figure 28:
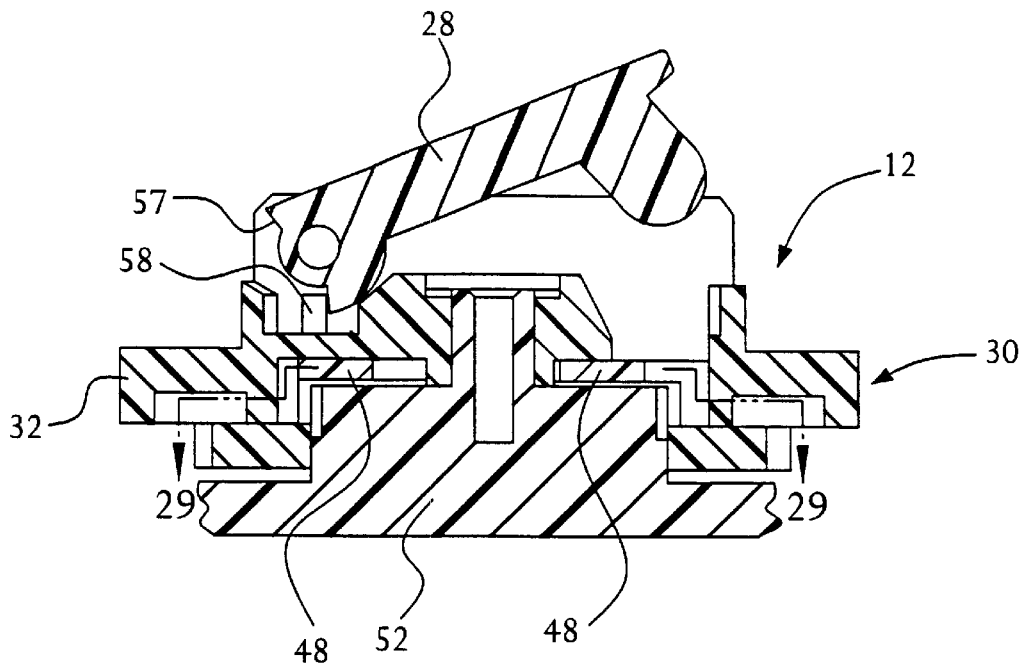
FIG. 28 is a cross section of the preferred embodiment of FIG. 25 with the preferred embodiment in a third position.
Figure 29:
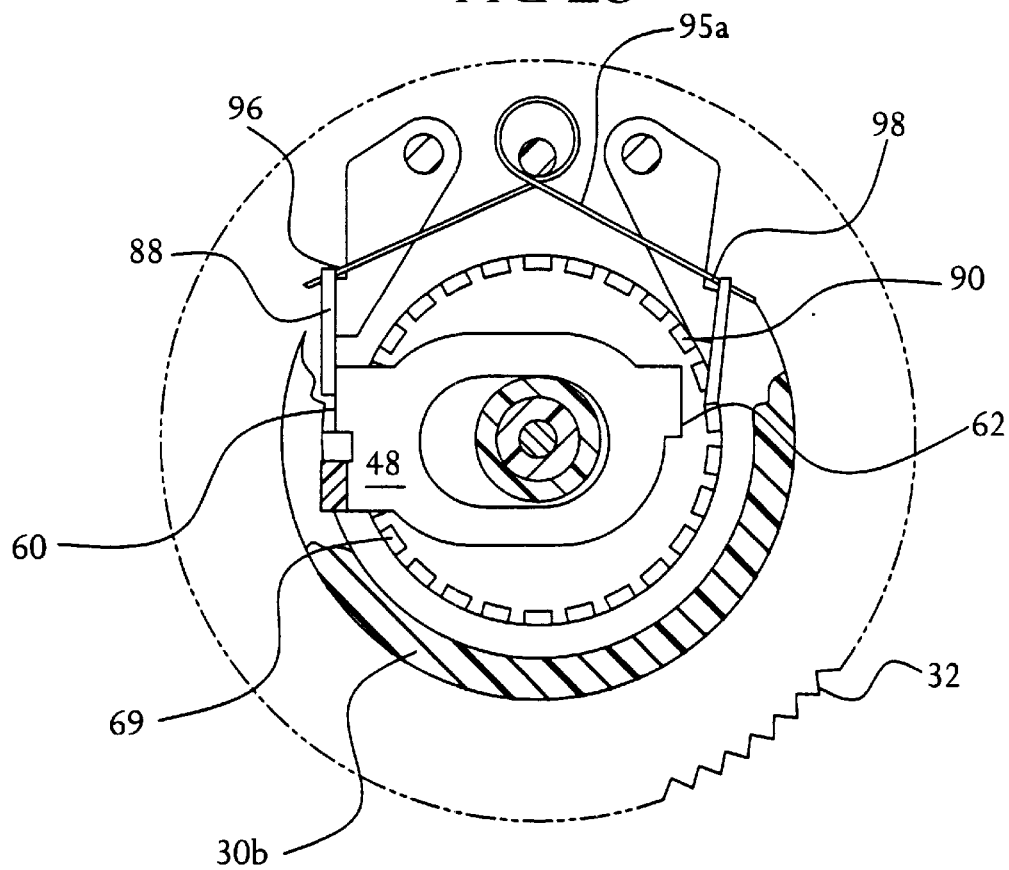
FIG. 29 is a cross-section taken along line 29—29 of FIG. 28.

The rewind crank 28 is preferably pivotably mounted to the combined advance/rewind mechanism 12 as shown in FIG. 10. A pin 38 may extend through a bore 40 defined with the rewind crank 28 and the cap 36, so that the rewind crank 28 may be pivoted about the pin 38 between a first position and a second position. In a first position, the rewind crank 28 may be rotated to fit within a groove 46 defined within the combined advance/rewind mechanism 12, as shown in FIG. 12. In its second position, the rewind crank is fully rotated, out of the groove, as best shown in FIG. 14. With the rewind crank 28 in this first position, the thumb wheel 30 may be rotated to advance or thrust film 14 from the film cassette 16 into the film path and to the film spool 22, but may not be rotated to rewind film 14 from the film path into the film cassette 16. Conversely, in the second position the thumb wheel 30 may be rotated to rewind film 14 from the film spool 22 to the film cassette 16, but may not be rotated to thrust film from the film cassette 16 into the film path. The rewind crank 28 interfaces with the interlock 26 described below to control the direction of rotation of the thumb wheel 30. If the rewind crank 28 is rotated to a third position, which includes any position between its first and second position, the interlock 26 will prevent rotation of the thumb wheel 30 in either direction, as shown in FIGS. 28 and 29. Thus, with the rewind crank 28 in this third position, the film 14 cannot be advanced nor can it be rewound.

The rewind crank 28 may have a tab 42 that extends at an angle to the handle 44 of the rewind crank 28, so that a camera user may relatively easily rotate the rewind crank 28 from the first position depicted in FIG. 12 to the second position, shown in FIG. 14. Preferably, the handle 44 of the rewind crank 28, shown in FIG. 10, is held in the groove 46 defined within the cap 36 of the combined advance/rewind mechanism 12 by a frictional force created between the handle 44 and detents or the like extending from the combined advance/rewind mechanism 12 into the groove 46.

As is best shown in FIG. 10, the interlock 26 preferably includes a slidable plate 48, a spring mechanism 50 and a stationary support 52. The slidable plate 48 is preferably slidable between a first position and a second position. Further, the slidable plate 48 preferably has a first raised portion 54 and a second raised portion 56. The first raised portion 54 is preferably of a height that is greater than the height of the second raised portion 56, as is best illustrated in FIG. 12. The first raised portion 54 may have a lip 58 that fits within a space defined between an end 57 of the rewind crank 28 and an inner surface 59 of the body 34 of the combined advance/rewind mechanism 12, as is also shown in FIG. 12. The lip 58 can be engaged by the end of the rewind crank 28, so that the slidable plate 48 may be moved between the first position, illustrated in FIGS. 12 and 13, and its second position, depicted in FIGS. 14 and 15. These raised portions 54, 56 interface with the spring mechanism 50 and the rewind crank 28, as is described in more detail below, to prevent the rotation of the advance wheel 30 in either the rewind direction or the advance direction depending upon the position of the rewind crank 28.

Figure 13:
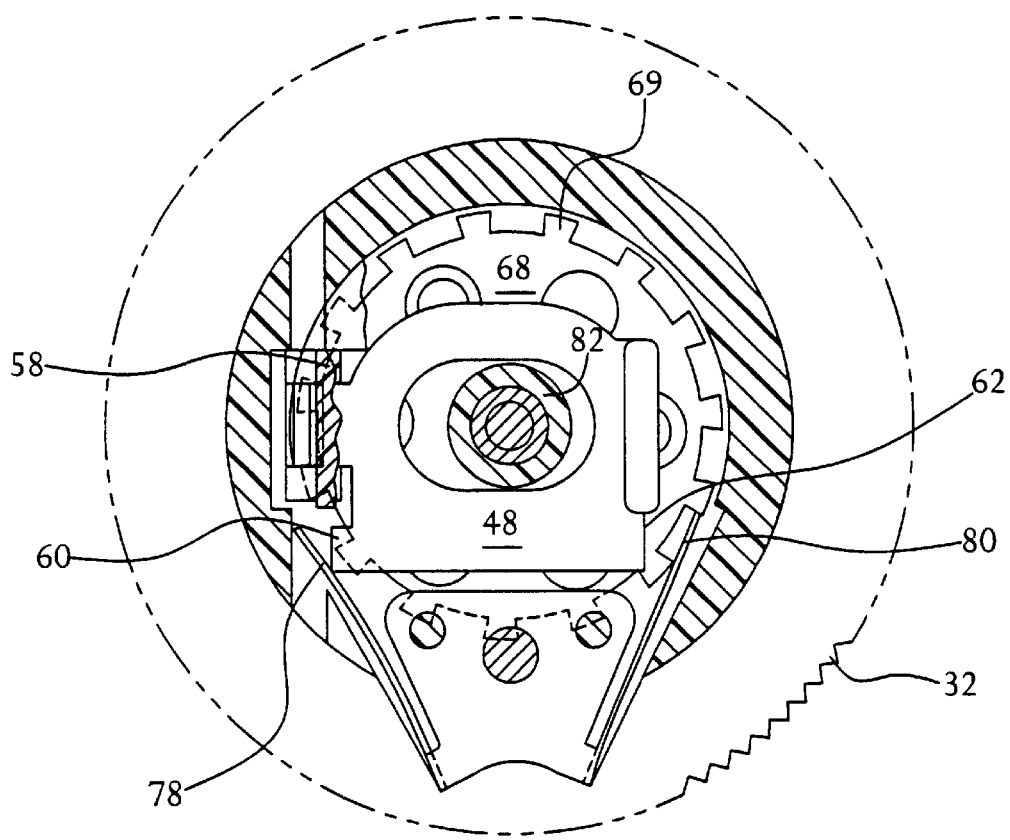
FIG. 13 is a cross-section taken along line 13—13 of FIG. 12.

The slidable plate 48 may further have a first engaging surface 60 and a second engaging surface 62, as shown in FIGS. 10, 13 and 15. Each of these engaging surfaces 60, 62 is for engaging one of the springs 64 of the spring mechanism 50, as is described further below.

The stationary support 52 preferably has a circular portion 66 extending from the camera body. This circular portion 66 is preferably integrally formed with the camera body. However, the stationary support 52 may be a separate piece from the camera body and may be attached to the camera body with a variety of fastening mechanisms. The stationary support 52 may further include a circular plate 68 that has a plurality of teeth 69 extending from its periphery. These teeth 69 interface with the spring mechanism 50 described below to control the direction of rotation of the combined advance/rewind mechanism 12.

The circular portion 66 of the stationary support 52 may have a plurality of cylinders 69a extending from its upper surface. Disposed within the circular plate 68 may be a plurality of holes 69b that are placed within the circular plate 68 to correspond to the cylinders 69a extending from the circular portion 66. The cylinders 69a may be press fit into the holes 69b to attach the circular portion 66 to the circular plate 68 in an interference fit. When attached to the circular portion 66, the circular plate 68 is rigidly affixed to the body of the camera 10, so that it cannot rotate.

Figure 11:
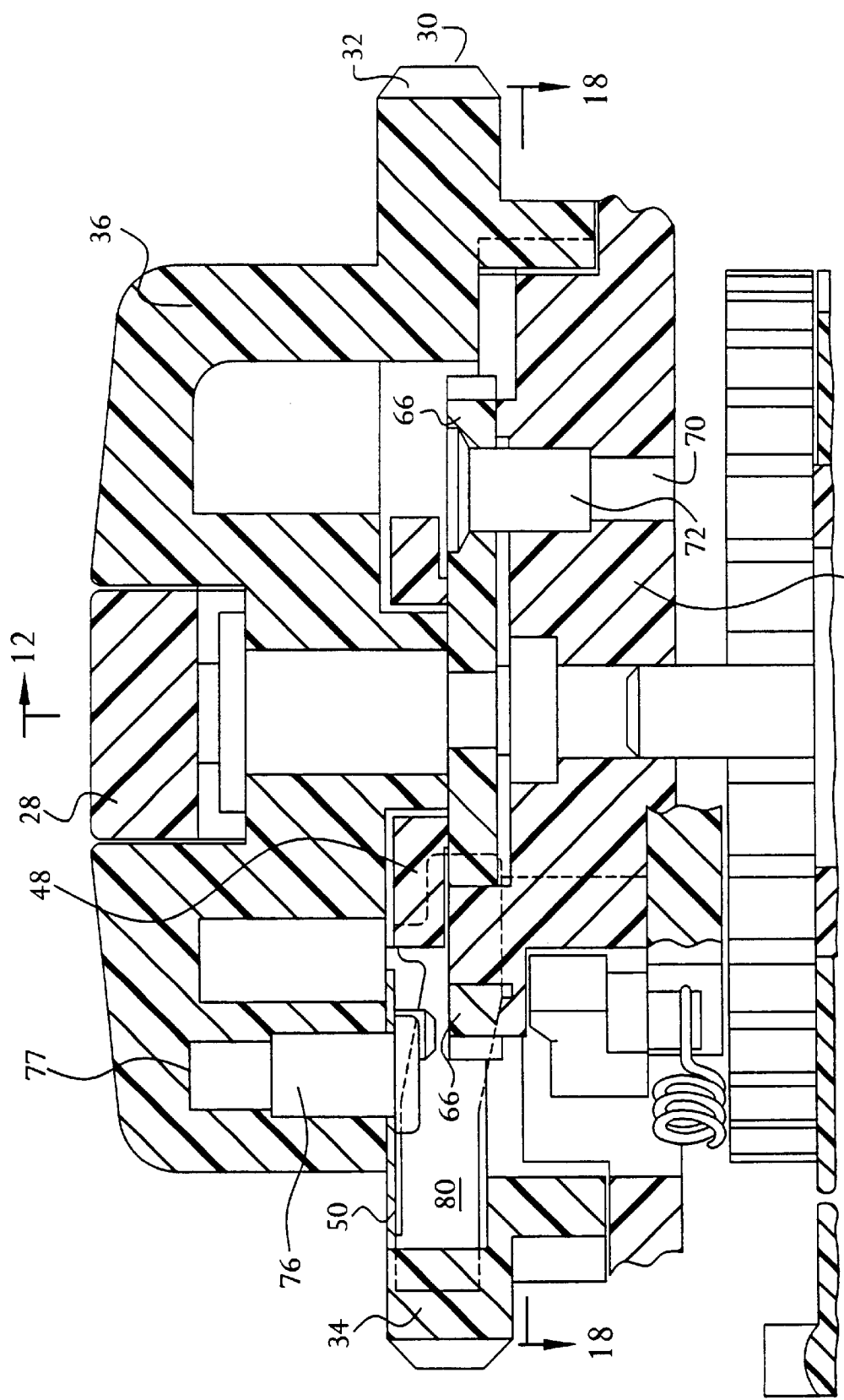
FIG. 11 is cross sectional taken along 11—11 of FIG. 2.

Further, the circular plate 68 and the circular portion 66 may both have an aperture 70 for receiving a pin 72 or rivet, as shown in FIGS. 10 and 11. The pin 72 may be placed through the apertures 70 to further affix the circular plate 68 to the circular portion 66. The pin 72 may have a head that prevents the circular plate 68 from becoming dislodged from the circular portion 66.

Depicted in FIG. 10 is a spring mechanism 50 according to a preferred embodiment of this invention. The spring mechanism 50 may be formed from plastic or from a stamping process. Disposed within the spring mechanism 50 may be an aperture 74 for receiving a pin 76. The pin 76 may be placed through the aperture 74 and into a cavity 77 within the combined advance/rewind mechanism 12 to affix the spring mechanism 50 to the combined advance/rewind mechanism 12, as is best shown in FIGS. 10 and 11. Because the spring mechanism 50 is attached to the body of the combined advance/rewind mechanism 12, the spring mechanism 50 rotates with the advance wheel 30. In contrast, the stationary support 52 including the circular portion 66 and the circular plate 68 are affixed to the camera body and do not rotate with the combined advance/rewind mechanism 12.

Extending from the spring mechanism 50 may be a first spring 78 and a second spring 80. In the preferred embodiment of FIGS. 10–15, the first and second springs 78, 80 are leaf springs. Further, each of the leaf springs are preferably biased in opposing directions, The first leaf spring 78 is preferably biased to rotate clockwise as viewed in FIG. 10, and the second spring 80 is preferably biased to rotate counter clockwise as viewed in FIGS. 10 and 13. As described in further detail below, the first and second springs 78, 80 are engageable with the teeth 69 of the circular plate 68 to prevent rotation of the combined advance/rewind mechanism 12 in either the rewind direction or the advance direction depending on the position of the rewind crank 28.

A rivet 82 or other fastening mechanism may be used to fasten the body 34 of the combined advance/rewind mechanism 12 to the camera 10. A hole 84 may be disposed within the body, and preferably the center of the body of the combined advance/rewind mechanism 12, for receiving the rivet 82. Another hole 86 may be disposed within the center of the slideable plate 48, the circular plate 66 and the circular portion 68, so that the rivet 82 may be inserted through each of these holes to fasten the body of the combined advance/rewind mechanism 12 to the camera 10, as is best shown in FIGS. 10 and 11. When fastened to the camera, the combined advance/rewind mechanism 12, the attached spring mechanism and the slidable plate are free to move with respect to the rivet 82. In contrast, the circular plate 68 and circular portion 66 are fixed and do not rotate.

Figure 17A:
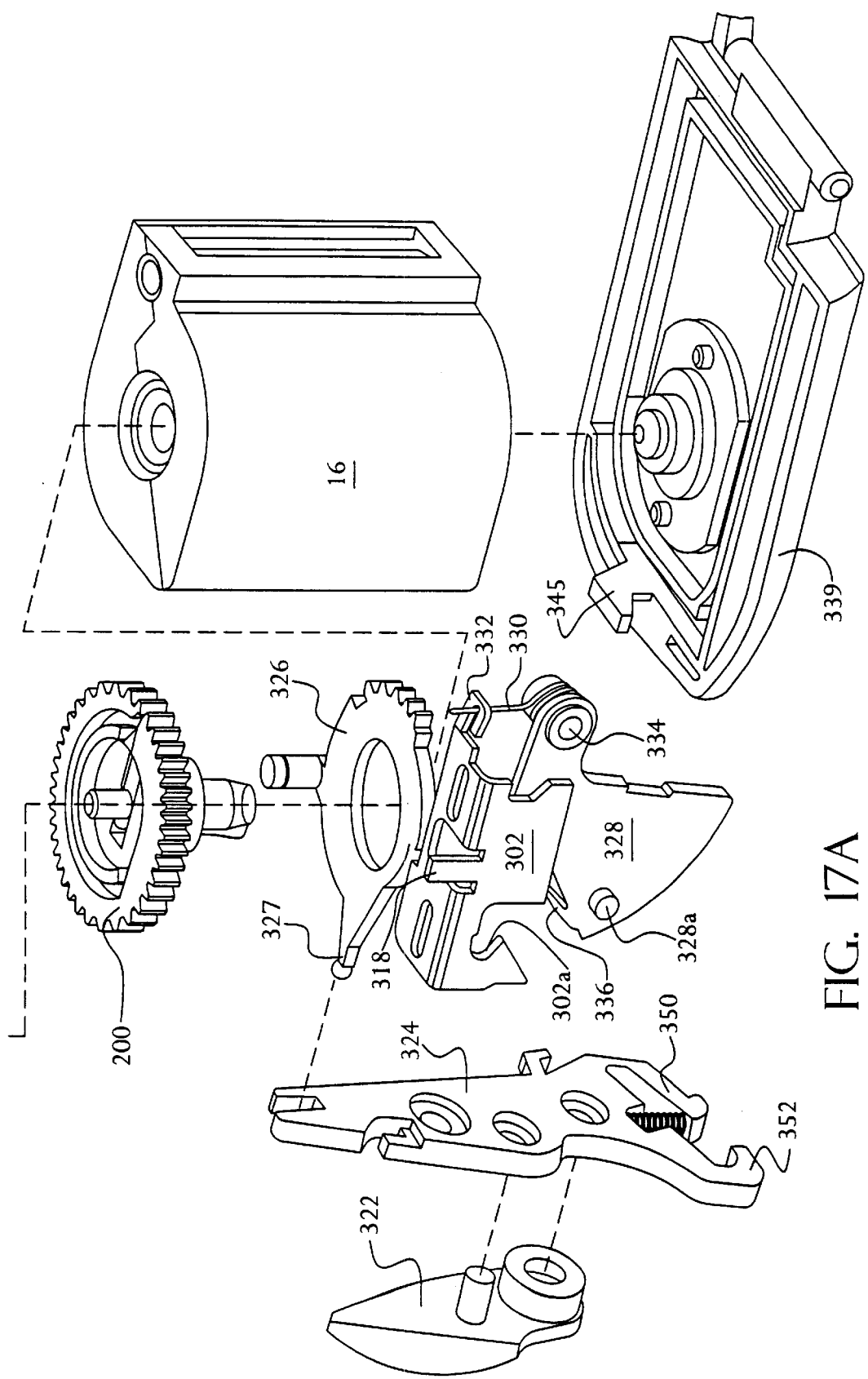

FIGS. 16, 17, and 17A best illustrate the assembly of the combined advance/rewind mechanism. As shown the combined advance/rewind mechanism is mounted upon the stationary support 52. Once mounted upon the stationary support 52, the combined advance/rewind mechanism rotates relative the stationary support 52. FIGS. 16 and 17 also depict aspects of the rewind interlock which are discussed below, and other aspects of a camera that may be employed with this invention that are described is commonly assigned co-pending U.S. patent application Ser. No. 09/400,963 entitled "APS Camera For Ensuring The Cassette Indicator Is In The Parked Position," which is hereby incorporated by reference.

FIGS. 12 and 13 depict the combined advance/rewind mechanism 12 in a first position or a film advance position. In the film advance position, the thumb wheel 30 cannot be rotated in the rewind direction and film 14 cannot be rewound into the cassette 16. Rather, the thumb wheel 30 can be rotated in the advance direction to move film 14 from the film cassette 16 to the film spool 22. The interlock 26, formed in part by the springs 78, 80, prevents rotation of the thumb wheel 30 in the rewind direction, as described below. In contrast to FIG. 12, FIGS. 14 and 15 depicts the combined advance/rewind mechanism 12 in the second or rewind position. Because of the interlock, film 14 can be rewound into the film cassette 16, but cannot be advanced from the film cassette when the advance/rewind mechanism is in the second position. Further operation of this embodiment is provided below, as is a description of another preferred embodiment of the combined advance/rewind mechanism and the interaction of both of these mechanisms with the film spool and the film cassette.

Operation of the Combined Advance/Rewind Mechanism

As shown in FIG. 12, the rewind crank 28 is in its first position in which it is rotated fully into the groove 46 of the combined advance/rewind mechanism 12. In addition, the slidable plate 48 is in its first position. As is best shown in FIG. 12, the lip 58 of the first raised portion 54 fits between the inner surface of the combined advance/rewind mechanism 12 and the rewind crank 28 in this first position. The first spring 78 of the spring mechanism 50 is held by the first engaging surface 60 of the slidable plate 48, so that the first spring 78 cannot engage the teeth 69 of the stationary circular plate 68, as shown in FIG. 13. Because the first spring 78 is not engaged with the teeth of the circular plate 68, the combined advance/rewind mechanism 12 can rotate in the counterclockwise or advance direction to move film 14 from the film cassette 16 to the film spool 22.

As is further depicted in FIG. 13, the second engaging surface 62 of the slidable plate 48 does not engage the second spring 80 while the rewind crank 28 and the slidable plate 48 are in their respective first positions. Because, the second spring 80 is biased towards the teeth of the stationary support, the second spring rotates to engage one of the teeth of the circular plate 68, as is best shown in FIG. 13. This prevents rotation of the advance wheel 30 in the clockwise or rewind direction, as shown in FIG. 13, because the second spring 80 is engaged between two of the teeth 69 of the stationary circular plate 68. Thus, with the rewind crank 28 and the slidable plate 48 in the first position, the interlock 26 is formed that prevents rotation of the combined advance/rewind mechanism 12 in the rewind direction to move film 14 from the film spool 22 to the film cassette 16. However, rotation in the counterclockwise or advance direction is permitted.

As shown in FIG. 14, the rewind crank 28 may be rotated about the pivot pin 38 from its first position to its second position. When the rewind crank 28 is rotated, the end of the rewind crank 28 contacts the lip 58 of the slidable plate 48 and pushes the lip 58 of the slidable plate 48. The slidable plate 48 moves in response to the movement of the rewind crank 28 from its first position to its second position. As the slidable plate 48 moves, the first engaging surface 60 releases the first spring 78. Once released, the first spring 78 moves in between two of the teeth 69 of the circular plate 68. This prevents rotation of the combined advance/rewind mechanism 12 in the counter clockwise or advance direction.

Furthermore, when the slidable plate 48 moves to its second position, the second engaging surface 62 of the slidable plate 48 contacts the second spring 80 and pushes the second spring 80 out of engagement with the teeth 69 of the circular plate 68, as is best shown in FIG. 15. Once the second spring 80 is out of engagement with the teeth 69 of the circular plate 68, the combined advance/rewind mechanism 12 is free to rotate in the clockwise or rewind direction. Movement of the slidable plate 48 from the second position is inhibited by the crank 28, as shown in FIG. 14, until the crank is rotated out of its second position. Thus, with the rewind crank 28 in the second position, an interlock 26 is defined that prevents the camera 10 user from advancing the film 14 out of the film cassette 16 and into the film path 21.

It will be appreciated that the slidable plate 48 is preferably of dimensions, such that if the rewind crank 28 is in its third position, any rotational position between its first and its second position, the slidable plate 48 will release both the first and the second springs 78, 80. In this position, neither of the engaging surfaces 60, 62 contact the first and the second springs 78, 80. Therefore, both the first and the second springs 78, 80 rotate in between teeth 69 of the circular portion 66 of the stationary support 52. Since both of the springs 78, 80 are engaged with the circular portion 66, rotation of the combined advance/rewind mechanism 12 in both the rewind and the advance directions is inhibited. The interlock 26, therefore, provides an interlock 26 to prevent the camera user from rewinding or advancing film 14 unless the rewind crank 28 is in the proper position. If the rewind crank 28 is in the third position, rotation of the advance wheel 30 in either direction is inhibited by the interlock. Further, when the rewind crank 28 is in the first position, rotation of the advance wheel 30 in the rewind direction is prevented, and when the rewind crank is in the second position, rotation of the advance wheel 30 in the advance direction is prevented.

Second Embodiment of Combined Advanced/ Rewind Mechanism

Figure 25:
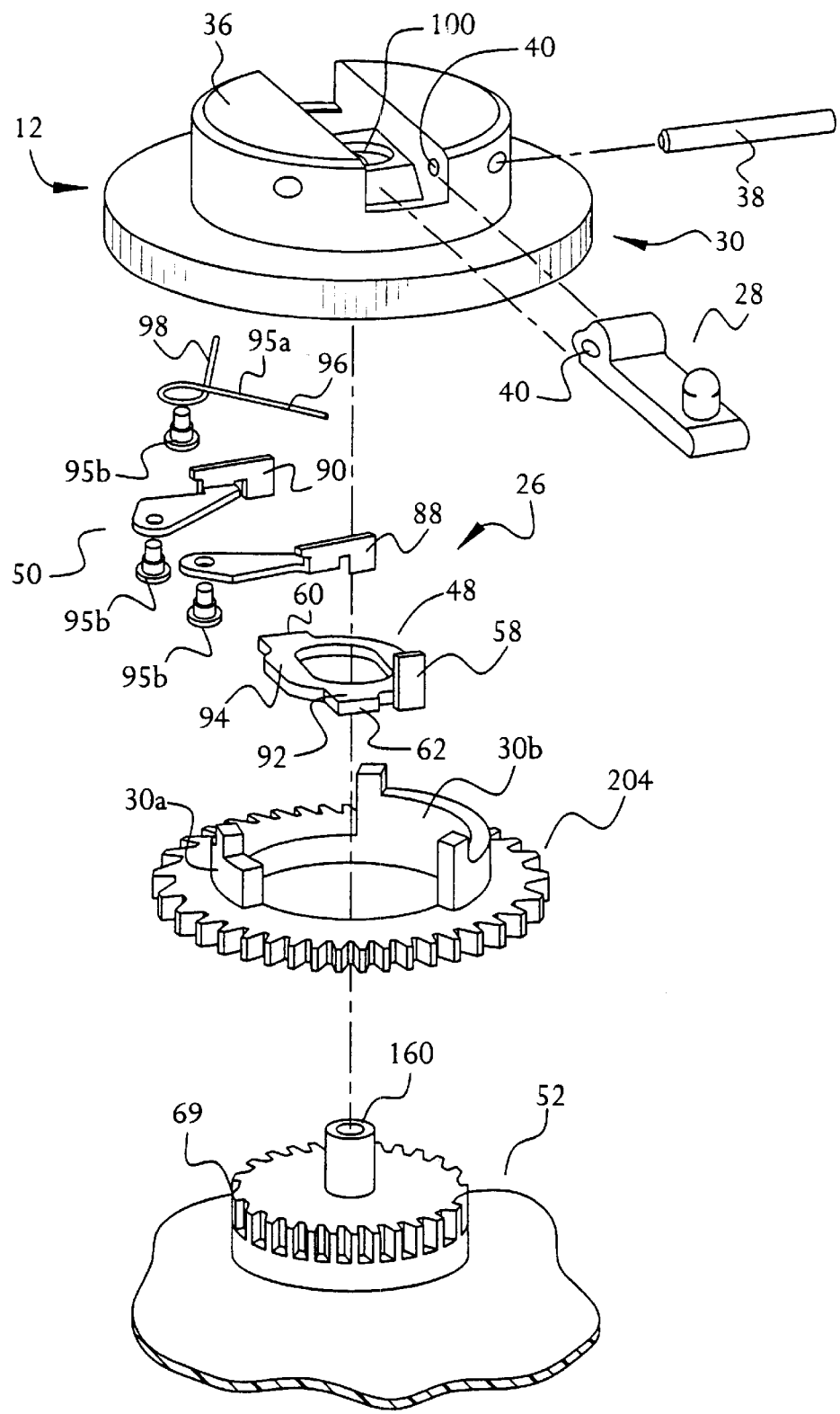
FIG. 25 is an assembly drawing of a combined advance/rewind mechanism according to a second preferred embodiment of this invention.
Figure 26:
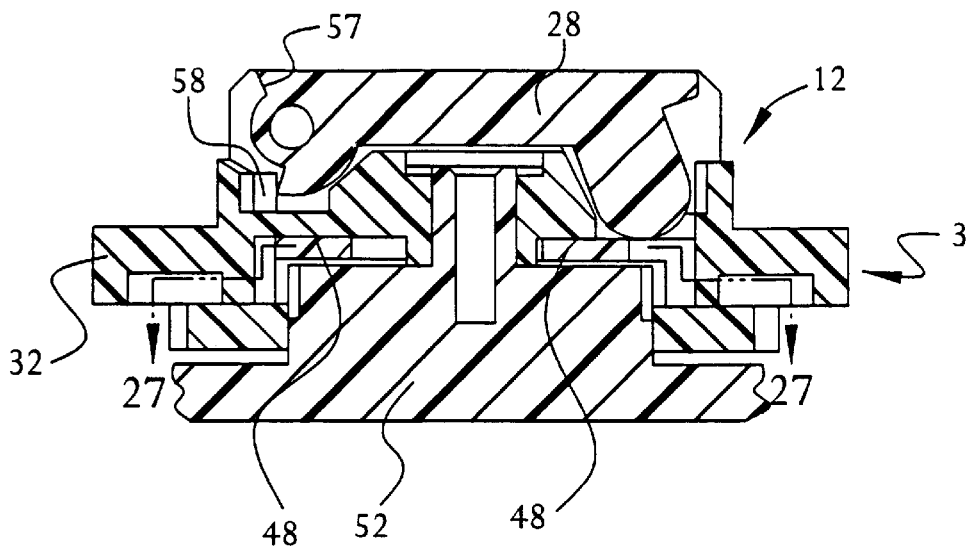
FIG. 26 is a cross section of the preferred embodiment of FIG. 25 with the preferred embodiment in a first position.
Figure 30:
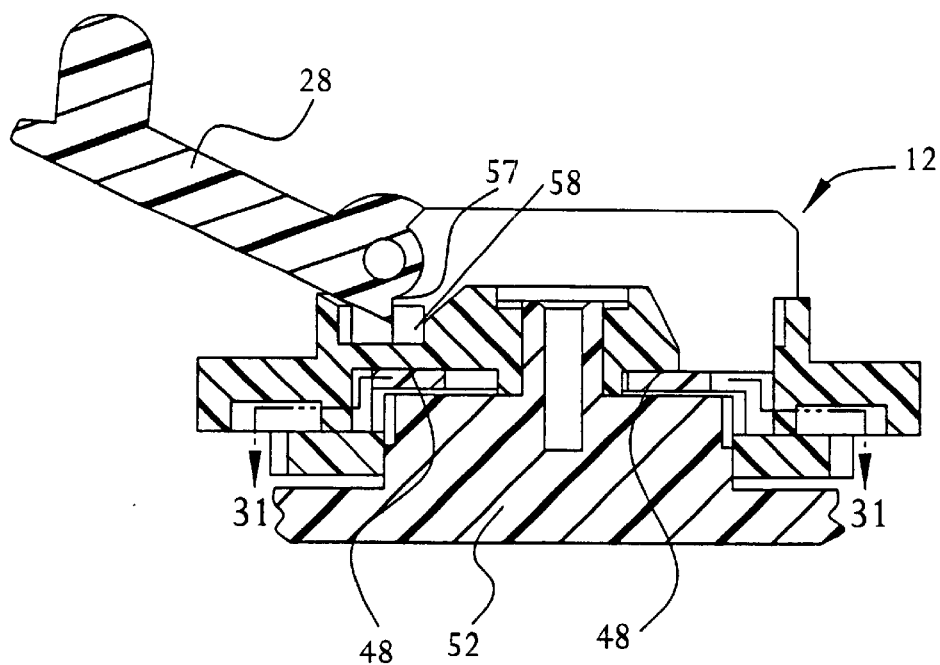
FIG. 30 is a cross section of the preferred embodiment of FIG. 25 with the preferred embodiment in a second position.

A second embodiment of the combined advance/rewind mechanism 12 is depicted in FIGS. 25–31. This second embodiment also includes a rewind crank 28 that is pivotably mounted to a body of the combined advance/rewind mechanism 12 with a pivot pin 38 or the like. Similar to the rewind crank 28 described above, the rewind crank 28 may have a first position in which it is rotated into a groove 46 defined within the cap 36 of the combined advance/rewind mechanism 12, as shown in FIG. 26 and a second position, as shown in FIG. 30, in which the rewind crank 28 is fully rotated out of the groove 46. The rewind crank 28 may have a third position, that includes any rotational position between the first and the second positions. One such position is exhibited in FIG. 28.

A stationary support 52 is also provided. In this embodiment, the stationary support 52 has a periphery around which a plurality of teeth 69 are disposed. The stationary support 52 is rigidly affixed to the camera 10; it may be molded with the body of the camera 10 or affixed in another manner. A slidable plate 48 is also provided in this embodiment. The slidable plate 48 is also moveable between a first position and a second position in response to manipulation of the rewind crank 28 from its first position to its second position. Further, the slidable plate 48 also defines part of the interlock 26 that prevents rewinding film 14 when the rewind crank 28 is in the first position, and advancing film 14 when the rewind crank 28 is in the second position.

The slidable plate 48 may further have a first and a second engaging surfaces 60, 62 for respectively engaging a spring biased first pawl 88 and a spring biased second pawl 90 of the spring mechanism 50. In this embodiment the first and the second engaging surfaces 60, 62 are not defined on raised portions of the slidable plate, but rather on the first and the second laterally extending portions 92, 94. The slidable plate 48 may further have a lip 58 for interfacing with an end of the rewind crank 28, so that as the rewind crank 28 moves between its first and second positions, the slidable plate 48 moves between its first and second positions.

In this embodiment the combined advance/rewind mechanism 12 is not integrally formed with the driving gear 204 and includes an advance wheel 30 and a cap 36. The driving gear 204 may be coupled to the cap 36 with the first and the second portions 30a, 30b extending upward from the driving gear 204. The cap 36 may have an under surface that is shaped for receiving the upwardly extending portions of the driving gear 204. Adhesives or other mechanical means may be used to join the driving gear 204 to the cap.

When attached together, the driving gear 204 fits over the stationary support 52 and under the cap 36, as best understood with reference to FIGS. 25 and 26. The driving gear 204 may be integrally formed with the cap 36. For example, molded plastic could be used to form an integral driving gear 204 and cap 36.

Figure 18:
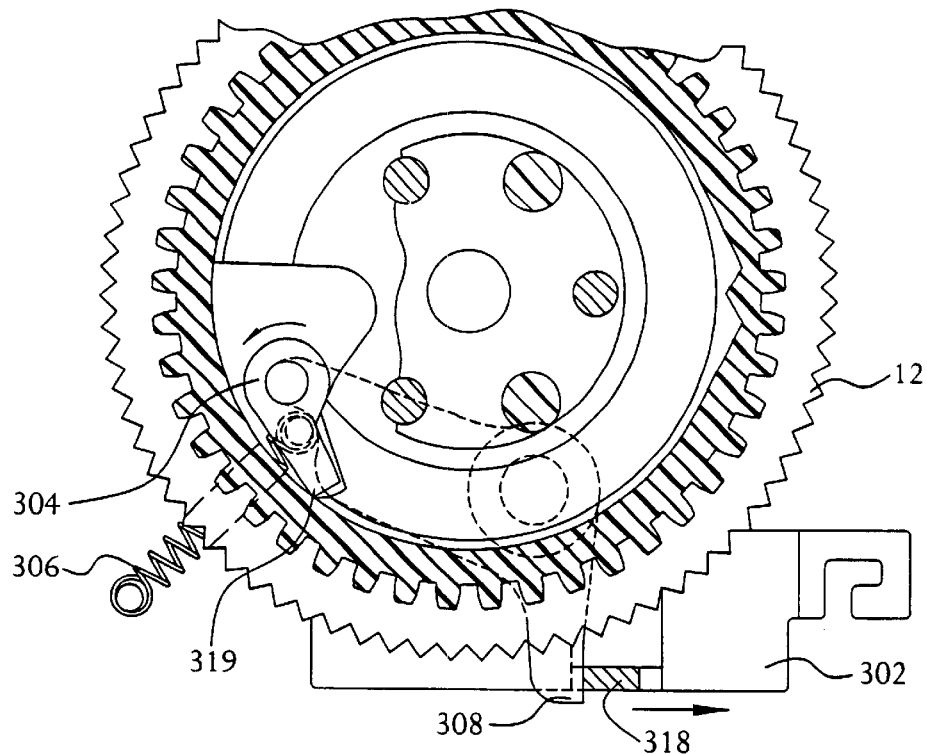
FIG. 18 is top view of the embodiment of the rewind interlock of FIG. 16 in a first position.
Figure 27:
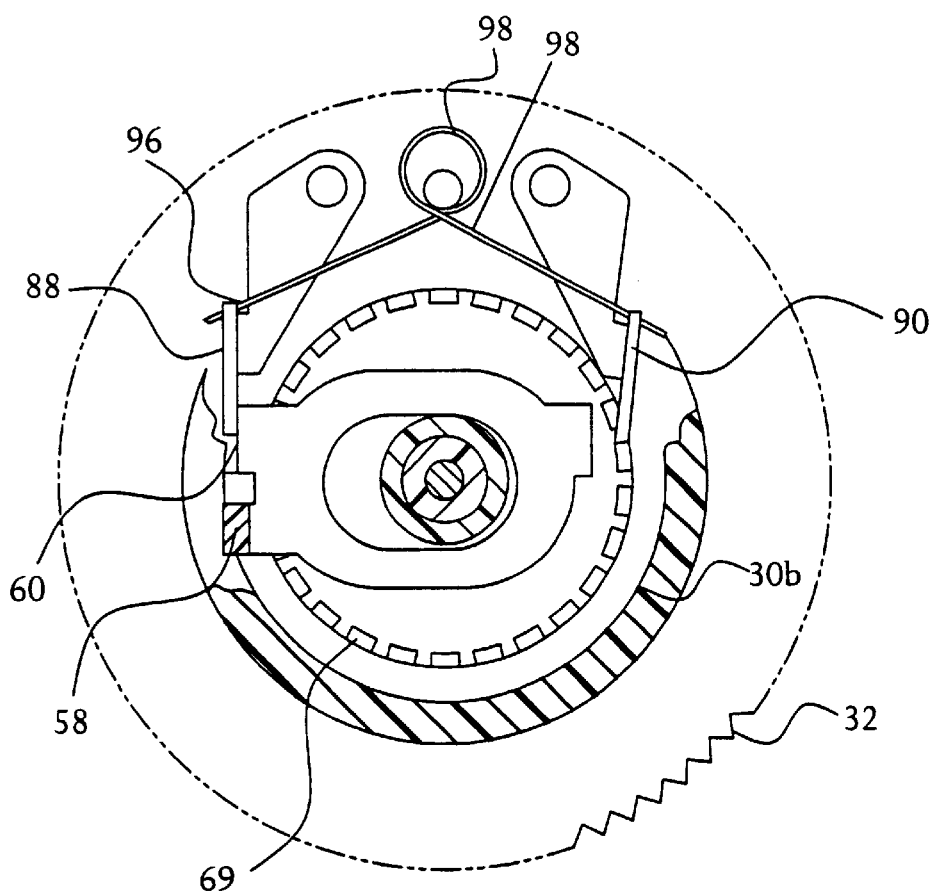
FIG. 27 is a cross-section taken along line 27—27 of FIG. 26.

In this embodiment, the spring mechanism 50 includes a first pawl 88, a second pawl 90 and a spring 95a. Rivets 95b or the like maybe used to fasten each of the pawls 88, 90 and the spring 95a to the underside of the cap 36, as shown in FIGS. 25–27. In this embodiment, the spring 95a is preferably a wound piece of metal that is wound about one of the rivets 95b. The spring 95a has a first member 96 that pushes on the first pawl 88 and a second member 98 that pushes on the second pawl 90. Each of these members 96, 98 biases the respective pawl 88, 90 to rotate towards the teeth 69 of the stationary support 52, as shown in FIG. 18.

The cap 36 and the stationary support 52 may have a hole 100 for receiving a pin or rivet (not shown) for connecting the cap 36, the stationary support 52 and the advance wheel 30 together, as shown in FIGS. 25 and 26. These holes 100 are preferably in the respective geometric centers of these elements.

This second embodiment operates similar to the first embodiment described above. An interlock 26 is defined by the rewind crank 28, the spring mechanism 50, the stationary support 52 and the slidable plate 48 that prevents advancing film 14 from the film cassette 16 unless the rewind crank 28 is rotated into the first position with the groove 46 of the cap 36, as shown in FIG. 26 and rewinding film 14 into the film cassette 16 unless the rewind crank 28 is rotated to the second position, as shown in FIG. 30. FIG. 26 depicts the rewind crank 28 fully rotated into the groove 46 of the cap 36, the first position of the rewind crank 28.

In this position, the slidable plate 48 cannot move because the lip 58 of the slidable plate 48 is prevented from moving by the crank 28, as shown in FIG. 26. As shown, the slidable plate 48 is in its first position, and holds the first pawl 88 and the first member 96 of the spring mechanism 50 against spring pressure out of engagement with the teeth 69 of the stationary support 52. The second member 98 of the spring mechanism 50 is however free to rotate due to the bias of the spring and the second pawl 90 engages the teeth of the stationary support 52. This prevents the advance wheel 30 from being rotated in the counterclockwise direction, as shown in FIG. 27 (the clockwise direction as shown in FIGS. 2–8) to rewind film 14 into the film cassette 16. In this position, the advance wheel 30 can be rotated counterclockwise, as shown in FIGS. 2–8, to advance film 14 from the film cassette 16 to a film spool 22.

Figure 31:
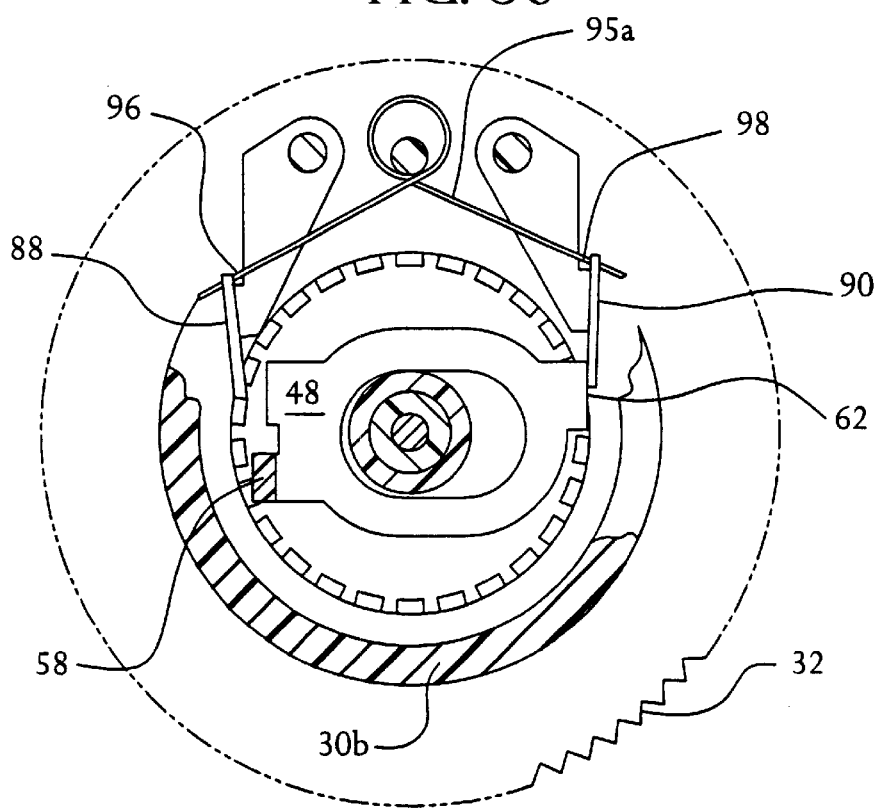
FIG. 31 is a cross-section taken along line 31—31 of FIG. 30.

In order to rewind film 14, the rewind crank 28 is rotated upward from its first position of FIG. 26 to its second position of FIG. 30. As the rewind crank 28 rotates upward, the end of the rewind crank 28 pushes on the lip 58 of the slidable plate 48 and pushes the slidable plate 48 to move from its first position to its second position. In its second position, the second engaging surface 62 of the slidable plate 48 pushes the second pawl 90 and the second member 98 of the spring mechanism 50 against the bias of the spring 95a out of engagement with the teeth 69 of the stationary support 52. Furthermore, the slidable plate 48 releases the first member 96 of the spring mechanism 50. Once released, the first member 96 moves due to the force of the spring 95a into engagement with the teeth 69 of the stationary support 52, as shown in FIG. 31. In this position, the first member of the spring mechanism 50 inhibits movement of the advance wheel 30 in the clockwise or advance direction, as shown in FIG. 31 (the counterclockwise direction as shown in FIGS. 2–9). However, the advance wheel 30 is free to rotate in the counterclockwise or rewind direction. Thus, an interlock 26 is defined which prevents the rotation of the advance wheel 30 in the advance direction to move film 14 from film cassette 16 when the rewind crank 28 is in the second or rewind position.

If the rewind crank 28 is in the third position, as shown in FIG. 28, the end of the rewind crank 28 moves the slidable plate 48 from its first position to a third position. In its third position, the slidable plate 48 releases the first member 96 of the spring member so that the first pawl 80 engages the teeth of the stationary support 52, as shown in FIG. 29. Additionally, in its third position, the slidable plate 48 is not moved far enough to move push the second pawl 90 and the second member 98 of the spring mechanism 50 out of engagement with the teeth 69 of the stationary support 52. Thus, in this position both the first and the second members 96, 98 of the spring mechanism 50 are engaged with the teeth 69 of the stationary support 52.

The first member 96 inhibits rotation of the advance wheel 30 in the advance direction, and the second member 98 inhibits rotation of the advance wheel 30 in the rewind direction. Therefore, with the rewind crank 28 in its third position, the advance wheel 30 cannot be manipulated to move the film 14 into or out of the film cassette 16. This interlock 26 prevents the camera user from accidently moving the film 14 in an undesired direction.

Gear Train

In the embodiment depicted in FIGS. 1 and 2, the gear train 24 includes a plurality of gears including, a film cassette gear 200, a film spool gear 202 and a driving gear 204. This gear train may be employed with either of the embodiments of the combined advance/rewind mechanism described above. Although the plurality of gears may be designed to have any number of gears, the embodiment depicted has eleven gears (gears 206–224) disposed between the driving gear 204 and the film spool gear 202. The driving gear 204 is rotatably mounted to the camera 10, so that it rotates with the advance wheel 30 in the same direction as the advance wheel 30. Further, the film cassette gear 200 is rotatably mounted to the camera 10 and selectively connectable to gear 206 and gear 208. The film cassette gear 200 is also connectable to a spindle 27 of the film cassette 16 by shaft 201, shown in FIG. 1, so that rotation of the film cassette gear 200 causes rotation of the spindle 27 and movement of film 14 either into or out of the film 14 cassette 16 depending upon the direction of rotation of thumb wheel 30.

Gear 210 is coupled to the driving gear 204, so that gear 210 rotates in response to rotation of the driving gear 204 by the combined advance/rewind mechanism 12 in the opposite direction of the driving gear 204. Gear 212 is preferably mounted on a common shaft with gear 210, as best seen in FIG. 1, so that gears 210 and 212 rotate in the same direction. Gears 206 and 208 are mounted at an elevation below gear 210 and the driving gear 204 and at the elevation of gear 212 and the film cassette gear 200, so that they can engage gear 212 and the film cassette gear 200, as best seen in FIG. 1.

Gear 212 couples gears 206 and 208 to the combined advance/rewind mechanism 12, so that rotation of the combined advance/rewind mechanism 12 drives either gear 206 and 208 to rotate. Preferably, gears 206 and 208 are smaller in diameter than the combined advance/rewind mechanism 12 and gear 210, so that gears 206 and 208 provide the appropriate increase in rotational speed between the combined advance/rewind mechanism 12 and gear 212. Gears 206 and 208 are pivotably mounted to the camera 10, so that they can pivot depending upon the direction of rotation of gear 212 and the combined advance/rewind mechanism 12. They may be mounted on a plate 230, shown diagrammatically, that is pivotably mounted to the camera 10 to rotate about the center of gears 210 and 212, and spring biased by a spring 231 so that the gear 208 is engaged with the film cassette gear 200 and the gear 206 is not. The spring 231 is connected to the plate 230 proximal to the gear 208, and the spring's end that is proximal to the gear 212 is not fixed. The spring 231 provides a relatively small drag force that prevents the plate 230 from rotating when gears 206 and 208 are not being driven, so that they do not move around in the camera due to gravity or mechanical forces. The force applied by spring 231 is large enough to prevent random movement of gears 206 and 208, but small enough so an not to impede rotation of gear 200.

As is described in more detail below, gears 206 and 208 operate as a free wheeling clutch. If the combined advance/rewind mechanism 12 is rotated counter clockwise, the film advance direction, as viewed in FIG. 2, the drive gear 204 will cause gear 210 and gear 212 to rotate clockwise. Gear 212 will push gear 206 to pivot on the pivot plate 230 against the bias of spring 231, so that gear 206 is driven out of engagement with the film cassette gear 200. In contrast, since gear 208 is mounted on the pivot plate 230 with gear 206, the rotation of gear 212 causes gear 208 to pivot into engagement with the film cassette gear 200. In this position, the film cassette gear 200 is driven in the clockwise direction by gear 208 to thrust film. Conversely, if the combined advance/rewind mechanism is rotated in the clockwise or rewind direction, gear 208 will be driven out of engagement with the film cassette gear 200, and gear 206 is released to move into engagement with the film cassette gear 200 to rewind the film into the film cassette.

Gear 212 is coupled to gear 214, and gear 216 is mounted on a common shaft with gear 214, as best seen in FIGS. 1 and 2. Gear 216 is coupled to gear 218, which is coupled to gear 220. Gears 214 and 216 rotate in the same direction to transmit the driving force from the combined advance/rewind mechanism to gears 218 and 220 Gears 218 and 220 preferably have the same diameter and number of teeth and therefore, serve as idler gears. Gear 222 is coupled to gear 220, and is also pivotably mounted to the camera 10 on a pivot plate or other movable mechanism, so that it may be coupled to and decoupled from gear 224 depending upon the rotation of the combined advance/rewind mechanism 12. Gear 224 is coupled to the film spool gear 202 that drives the film spool 22 to rotate. A spring (not shown) similar to spring 231 can also be used to bias gear 224 to prevent it from moving due to gravity or other mechanical forces. The force applied by such a spring would be small enough so as not to impede rotation of the gear train.

Gear 222 moves between a first and a second position in response to the direction of rotation of the combined advance/rewind mechanism 12. When the combined advance/rewind mechanism is rotated in the advance direction, gear 220 exerts a force on gear 222 to pivot gear 222 on its pivot plate to a first position shown in FIG. 2. In this first position, gear 222 is coupled to gear 224, so that gears 222 and 224 couple the combined advance/rewind mechanism 12 to the film spool gear 202. While in this first position, manipulation of the combined advance/rewind mechanism 12 will cause rotation of the film spool gear 202 and therefore, rotation of the film spool 22 in a direction that pulls film around the film spool 22. In contrast, if the combined advance/rewind mechanism is rotated in the rewind direction, gear 220 is rotated in the opposite direction and exerts a force on gear 220 to pivot gear 222 on its pivot plate to a second position, as shown in FIG. 8. While in this second position, gear 222 is decoupled from gear 224. Thus, while gear 222 is in its second position, the combined advance/rewind mechanism 12 is decoupled from the film spool gear 202 and manipulation of the combined advance/rewind mechanism 12 will not drive the film spool 22 to rotate.

Depending on the amount of film that is wrapped around the film spool and the tension of the film, the film will be either thrust from the film cassette by the rotation of the cassette spindle or pulled from the film cassette by the rotation of the film spool when the advance/rewind mechanism is rotated in the counterclockwise or advance direction. In order to move the leading edge of the film out of the film cassette after the initial loading of a film cassette into the camera, the film is thrust from the film cassette and into the film exposing area. During advancement of film, gear 212 drives gear 208 to drive the film cassette gear 200 to thrust film from the film cassette. In addition, gear 212 drives the film spool gear 202 to rotate.

This occurs because when the combined advance/rewind mechanism 12 is rotated counterclockwise or in the advance direction, gear 220 exerts a force on gear 222 due to the direction of rotation of gear 220 that urges gear 222 towards gear 224 to couple gear 222 to gear 224 to rotate the film spool gear 202. Thus, as film is being initially thrust from the film cassette, both the film spindle and the film spool are being driven. Because the film is initially wrapped around the film spindle and not the film spool, initial movement of the film from the film cassette is by thrusting the film due to the rotation of the film spindle.

As described, rotation of the combined advance/rewind mechanism in the advance direction rotates the film cassette spindle and the film spool. Rotation of the film cassette spindle will thrust film from the film cassette and rotation of the film spool will pull film from the film cassette. Since both the film cassette spindle and the film spool can be rotated by the combined advance/rewind mechanism, whether the film is being thrust or pulled when the film is being advanced depends upon several factors, including whether the film is wrapped around the film spool, the relative speeds of rotation of the film spindle and the film spool and whether the film within the film path and the film cassette is relatively taught. Because of the pads 22a, any film wrapped around the film spool is wrapped relatively tightly around the film spool. The film spindle does not have pads to maintain the film tightly wrapped around the film spindle. Whether the film around the film spindle and within the film path is relatively taught or is under tension is dependent upon several factors, including the speed at which the film spindle and the film spool rotate and forces applied on the film within the film path, such as a force applied by a film sensor or metering finger used to count the frames of film that have been exposed and friction exerted on the film by the components that make up the film path.

Since just after loading a film cassette the film is not wrapped around the film spool, the film will be thrust when the combined advance/rewind mechanism is initially rotated in the advance direction. Because the film is not wrapped tightly around the spindle of the film cassette, the film is not under tension and is relatively slack as the leading edge of the film is initially thrust from the film cassette.

The thrusted film wraps around the film spool 22. The point of change over from thrusting to pulling occurs as the film within the film path and around the film spool becomes relatively taught and the film is pulled faster than it is thrust. The film is pulled rather than thrust, because of the speed differential between the rotation of the film spool and the spindle of the film cassette due to the gear train and the effective diameter of the film spool and the film spindle due to the respective amount of film wrapped around the film spool and the film spindle. The speed differential causes gear 208 to swing out of engagement with the film cassette gear 200, so that the combined advance/rewind mechanism is decoupled from the film cassette spindle. Gear 206 remains out of engagement with the film cassette gear 200, as the advance wheel is rotated in the advance direction. Continued rotation of the combined advance/rewind mechanism causes rotation of the film spool gear 202 and the film spool 22 which pulls the film from the film cassette and wraps the film around the film spool 22.

Depending on the linear speed differential between the film cassette and the film spindle, the film may be either thrust or pulled, as it is advanced. In one embodiment, the film is trust when advancing the first few frames because the linear speed of thrusting due to rotation of the film spindle is greater than the linear speed of pulling due to rotation of the film spool. After the first few frames have been advanced in this embodiment, as more film is wrapped around the film spool, the effective diameter of the film spool increases as does the linear speed of pulling. Once the linear speed of pulling is greater than the linear speed of thrusting, the film is pulled rather than thrust as it is advanced.

If the combined advance/rewind mechanism 12 is rotated in the clockwise or rewind direction, gear 212 will push gear 206 against the bias of spring 231 into engagement with the film cassette gear 200 and gear 208 out of engagement with the film cassette gear 200. The gears 206, 208 pivot on the pivot plate 230. In this position, gear 206 is connected to the combined advance/rewind mechanism 12 and the film cassette gear 200 is driven to rotate by the combined advance/rewind mechanism 12, as best seen in FIG. 8. Rotation of the film cassette gear 200 pulls film from the film path into the film cassette and around the spindle of the film cassette.

In contrast to rotation in the counterclockwise or advance direction, rotation of the combined advance/rewind mechanism in the clockwise or rewind direction, causes gear 220 to exert a force on gear 222 due to the direction of rotation of gear 220 that urges gear 222 away from gear 224 to disconnect gear 222 from gear 224. Therefore, rotation of the combined advance/rewind mechanism in the rewind direction will drive rotation of the spindle of the film cassette, but not rotation of the film spool.

Film Loading/Rewinding

An improved method of manually loading film 14, without a motor, is illustrated in FIGS. 2–7. Preferably, this improved method of manually loading film 14 applies to APS film 14 or film 14 that can be thrust from a film cassette 16. A film cassette 16 may be inserted into the camera 10 and light sealed with in the camera 10, as described in commonly assigned U.S. Pat. No. 5,689,733, entitled "Film Loading Method For A Single Use Camera," and U.S. patent application Ser. No. 08/855,073, entitled "Single Use Camera With Battery Located In Film Spool" both of which are hereby incorporated by reference. That is the film cassette 16 may be inserted through a door in the bottom of the camera 10, and a tab or other structure may be placed over the bottom of the camera 10 to light seal the camera 10, including the film cassette 16, the film spool 22 and the film path, this process is described in more detail below. Although this patent and application disclose a single use camera 10, it will be appreciated that a hinged tab, or other structure that can seal the film cassette compartment, can be employed in a reusable camera 10. Such a door is shown in the KODAK ADVANTIX™ 1600 camera 10, which is a camera 10 that employs a motor to move the move film 14 from the film cassette 16 to the film spool 22.

After the film cassette 16 is loaded into the camera 10, the light lock door of the film cassette 16 may be opened, similar to the way it is opened in the KODAK ADVANTIX™ 1600 camera. In that camera 10, the light lock door is interlocked with the tab over the film cassette compartment, so that when the tab is placed over the film cassette compartment, the light lock door of the film cassette 16 is opened. Other means may be employed to open the light lock door of the film cassette 16.

In order to manually thrust the film 14 from the film cassette 16 and load the film, the advance wheel 30 may be rotated in the advance or counter clockwise direction, as shown in FIG. 2. When rotated in the counterclockwise direction, the advance wheel 30 will rotate the drive gear 204 which is coupled to the advance wheel 30 in the clockwise direction. Gear 210 will be driven by the drive gear 204 to rotate in the clockwise direction, as will gear 212, since it is mounted on a common shaft with gear 210. Because gears 210 and 212 are rotating clockwise, gear 212 will push gear 208 into engagement with the film cassette gear 200 and drive gear 206 out of engagement with the film cassette gear 200. The film cassette gear 200 will be driven to rotate in the clockwise direction to thrust film 14 out of the film cassette 16, as shown in FIGS. 2 and 3.

As gear 214 rotates, it drives the gear train 24 to rotate in the directions indicated in FIG. 2. Gear 220 rotates in the counterclockwise direction and pushes gear 222 to engage gear 224 and couple the advance wheel 30 to the film spool gear 202. In this position, the rotation of the advance wheel 30 causes rotation of the film spool 22 in the counterclockwise direction so that it is moving in the direction to pull film 14 from the cassette 16.

Figure 6:
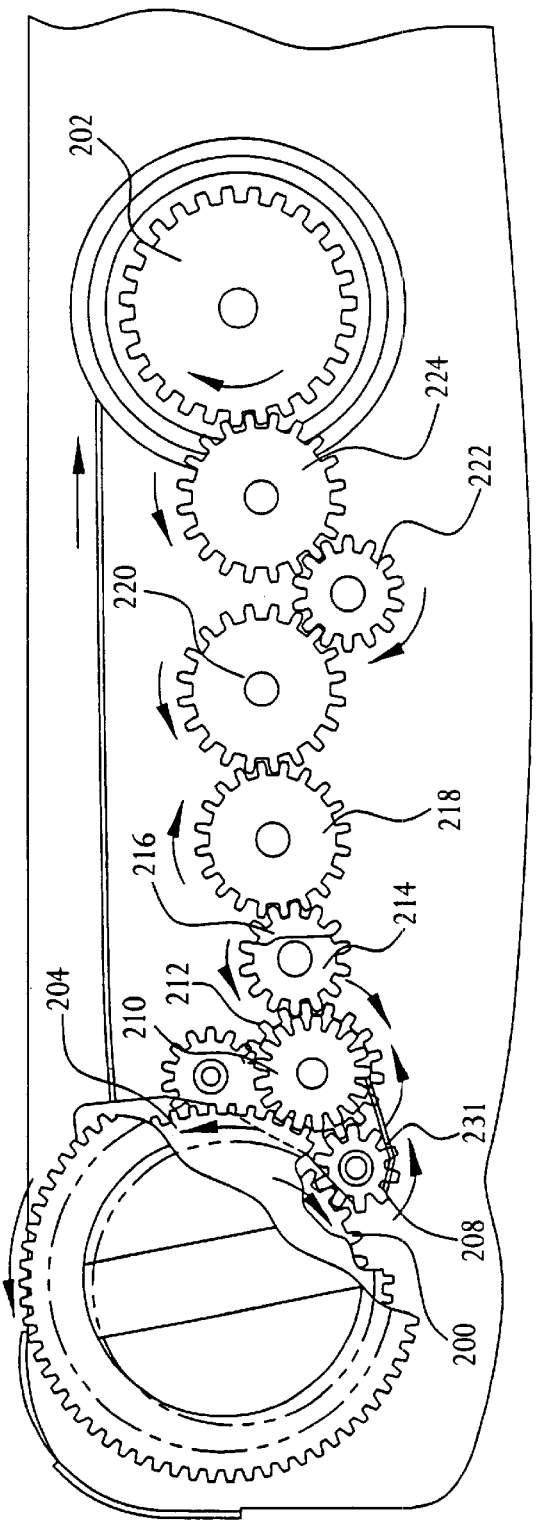
FIG. 6 is a diagrammatical top view of the preferred embodiment of FIG. 1 depicting the film being wound around the film spool.
Figure 7:
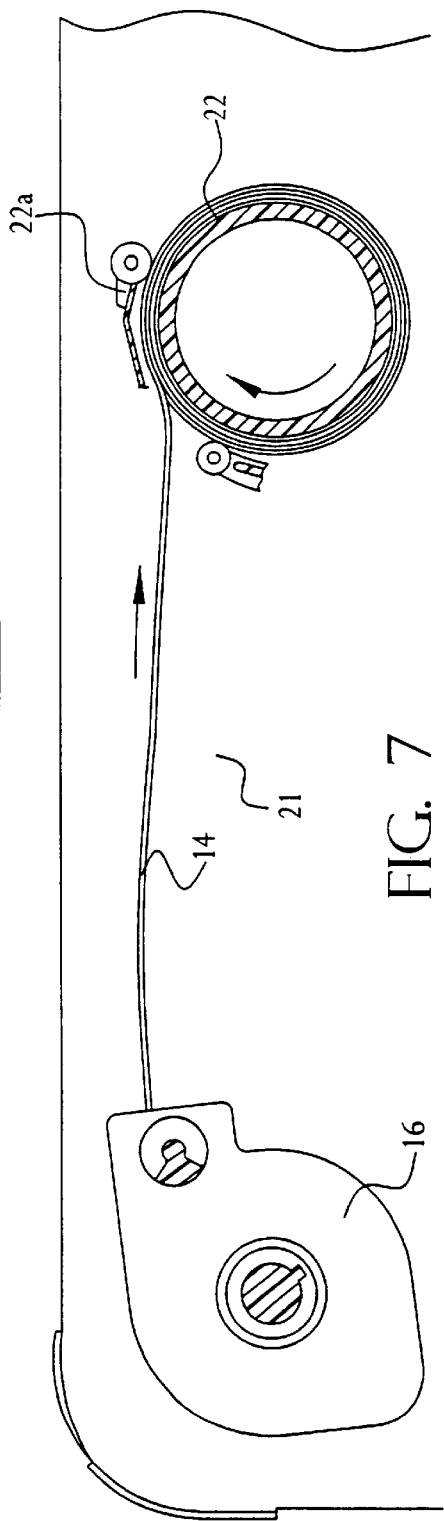
FIG. 7 is a diagrammatical top view of the preferred embodiment of FIG. 1 depicting the film cassette and the film spool as the film is being wound around the film spool.

As shown in FIGS. 4 and 5, continued rotation of the advance wheel 30 will thrust the film 14 until an edge of the film 14, the leading edge of the film engages the film spool 22 and the film 14 is wrapped around the film spool 22. Because as described above, the film is wrapped relatively loosely around the film spool, and the linear thrust speed is greater than the linear pulling speed, the film is thrust as it initially wraps around the film spool. As the film is wrapped around the film spool 22, the film is captured between the film spool 22 and one or more pads 22a which aid in winding the film relatively tightly around the film spool 22. Wrapping the film around the film spool 22, links the film spool to the spindle of the film cassette. The film acts as a belt. Due to the gear train 24, the film spool 22 is rotated faster than the film cassette spindle when the film is wrapped sufficiently around the film spool 22 and the film becomes relatively taught. Because of this increased speed of rotation and the linking of the film spool with the film cassette gear by the film, the film cassette gear 200 exerts a force on gear 208 to cause gear 208 to swing out of engagement with the film cassette gear, as depicted in FIG. 6 once a substantial amount of the slack has been removed from the film and the film is relatively taught. At this point, the combined advance/rewind mechanism is no longer coupled to the film cassette. Thus, continued rotation of the combined advance/rewind mechanism drives the film spool to pull film out of the film cassette and wrap the film around the film spool; the film is no longer thrust, as shown in FIGS. 6 and 7. As described above, depending on how taught the film is and the speed differential, the film movement may switch to thrusting as opposed to pulling. If the film becomes relatively slack due to how it is wrapped around the spindle inside of the cassette or forces exerted by the camera components of the film, gear 208 will swing back into engagement with the film cassette gear, so that the film is thrust rather than pulled as it is advanced. This occurs because as the film becomes relatively slack, the speed of rotation of the film spool decreases, and the gear 208 will swing back into engagement with the film cassette gear to drive the film.

The film is advanced out of the film cassette until the leading edge of the film is wrapped around the film spool and the first frame is disposed within the film exposing area of the camera. At this point the first frame of film is ready to be exposed. After a picture is taken with the camera, the combined advance/rewind is rotated to advance the exposed frame to the film spool and to position the next frame in the film exposing area. Depending on how taught the film is, this operation is depicted in either FIGS. 6 and 7 or FIGS. 4 and 5. The film is advanced by the rotating the thumb wheel of the combined advance/rewind mechanism in the advance or counter clockwise direction. This causes the film spool to rotate to pull the film around the film spool 22 or the film spindle to rotate and thrust film depending on the tension on the film as described above.

When film 14 is to be rewound into the film cassette 16 after all of the exposure have been taken, the advance wheel 30 is rotated in the clockwise direction, as shown in FIG. 8. This is done by rotating the rewind crank to its second position, so that the advance wheel can be turned in the clockwise or rewind direction. As described above, if the rewind crank is not rotated to its second position, the advance wheel cannot be rotated in the rewind direction. As the advance wheel rotates in the clockwise direction, the drive gear 202 also rotates in the clockwise direction and drive gears 210 and 212 to rotate in the counterclockwise direction. This motion of gear 212 causes gear 208 to remain out of engagement with the film cassette gear 200 and gear 206 to move into engagement with the film cassette gear 200. Gear 206 is driven to rotate in the clockwise direction, and it in turn drives the film cassette gear 200 to rotate in the counterclockwise direction. This motion of the film cassette gear 200 drives the spindle 27 of the film cassette 16 to rewind or pull film 14 from the film spool 22 back into the film cassette 16.

Gear 212 drives gears 214–220 to rotate, as shown in FIG. 8. Since gear 220 is driven to rotate in the clockwise direction, gear 220 causes gear 222 to rotate on its pivotable plate out of engagement with gear 224. In this position, the advance wheel 30 is decoupled from the film spool 22, so that when film is being rewound into the film cassette 16, the film spool 22 is not driven to rotate by the advance wheel 30. The film spool 22 does, however, rotate due to the pulling of film 14 to the film cassette 16, as shown in FIG. 9.

The advance wheel 30 used with the gear train 24 may be the combined advance/rewind mechanism 12 described above.

Rewind Interlock

As alluded to above, the camera of this invention may further include a rewind interlock that prevents a camera user from creating a double exposure or exposing the same frame of film twice and thereby destroying a picture. In the embodiment shown primarily in FIGS. 16–24, the rewind interlock prevents moving exposed film from the film path to the film spool after the exposed film has been rewound into the film cassette. Because of this interlock, exposed film, that has been rewound into the film cassette, cannot be advanced back into the film path. For instance, an exposed frame of film cannot be moved from the film cassette back into the film path by the accidental manipulation of the combined advance/rewind mechanism. This interlock may be used in combination with either embodiment of the combined advance/rewind mechanisms described above. Similarly, this interlock may be practiced with other film advance and film rewind mechanisms including the two embodiments described above. The rewind interlock of this invention may be practiced with a variety of film advancing mechanisms.

According to a preferred embodiment, the rewind interlock 300 includes a plate 302, a pawl 304, a spring 306, an interlock lever 308, the door 320 of the film cassette compartment, a stop 321, a door lever 322, an actuator 324, a segmented gear 326, a linkage 328 and a spring 330 as shown in FIGS. 16–24. FIGS. 16 and 17 are assembly drawings illustrating the assembly of the pawl 304 and the interlock lever 308 to the camera, and FIGS. 17A–17H depict features of the rewind interlock. FIGS. 18, 19, 20, 21, 22, 23 and 24 are top views and FIGS. 20A, 21A, 22A and 23A are bottom views depicting the operation of the rewind interlock. The interlock lever 308 may be rotatably mounted to the camera with a rivet 310 or any of a variety of fasteners, as best seen in FIGS. 16 and 17. Extending from one end of the interlock lever 308 may be a post 312. The post 312 may be integrally formed with the lever 308, as shown, or attached in a variety of manners. Connected to the post 312 may be the pawl 304. Preferably, the pawl 304 is rotatably mounted to the post 312. Thus, the pawl 304 is rotatable about two different axes; the pawl 304 rotates about the post 312 relative to the interlock lever 308 and rotates with the interlock lever 308, as the interlock lever rotates about the rivet 310.

As is best shown in FIG. 17, extending downward from the pawl 304 may be a stem 314. The stem 314 may be integrally formed with the pawl 304 or fastened to the pawl 304 in any of a variety of ways. The spring 306, shown in FIG. 18, may be coupled to the stem 314 and the main body of the camera. The spring 306 biases the pawl 304 to rotate in the counter clockwise direction as viewed in FIG. 18. Since the interlock lever 308 is coupled to the spring 306 by the pawl 304, the spring 306 also biases the interlock lever 308 to rotate, but in the clockwise direction. As shown in FIG. 17, the combined advance/rewind mechanism may have a notch 316 extending form an inner surface 318. The notch 316 interacts with the pawl 304 to prevent rotation of the combined film advance/rewind mechanism after film has been rewound. In particular, the notch 316 interacts with the angled end 319 of the pawl 304.

Figure 17B:
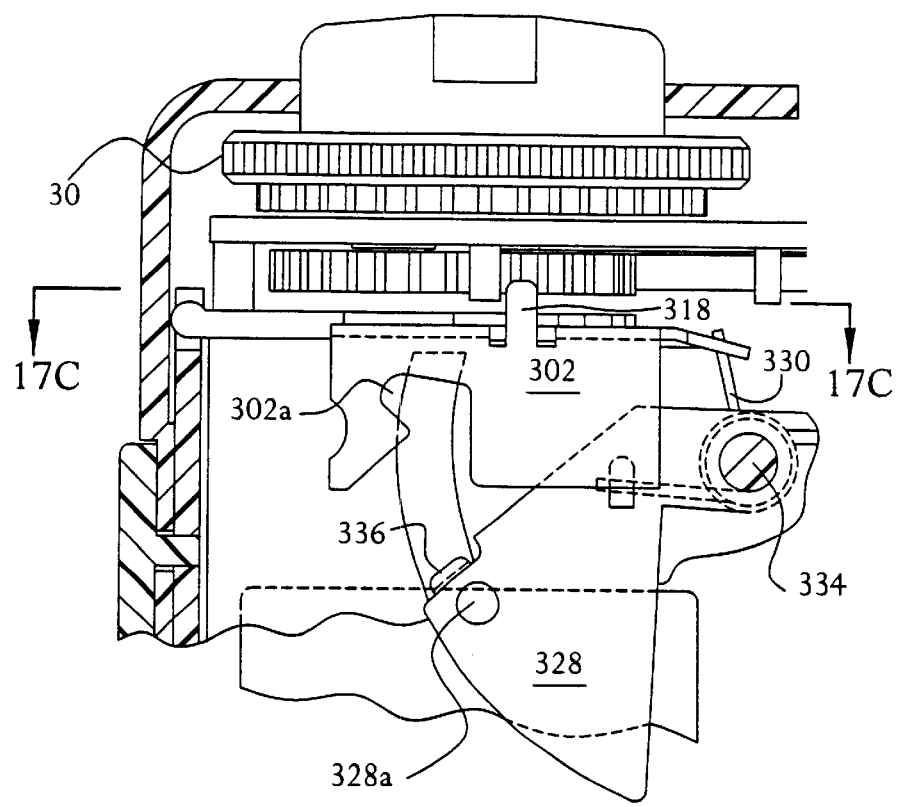
FIG. 17B is a diagrammatical view of the embodiment of FIG. 10, as the film cassette is being removed from the film cassette compartment.
Figure 17D:
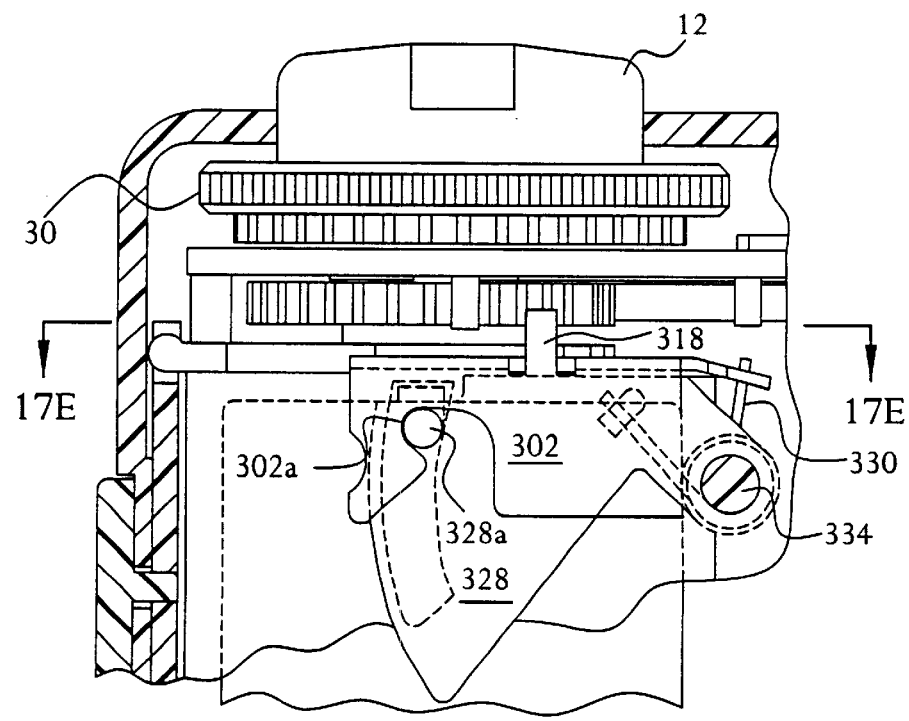
FIG. 17D is a diagrammatical view of the embodiment of FIG. 10 with a film cassette inserted into the film cassette compartment.
Figure 17C:
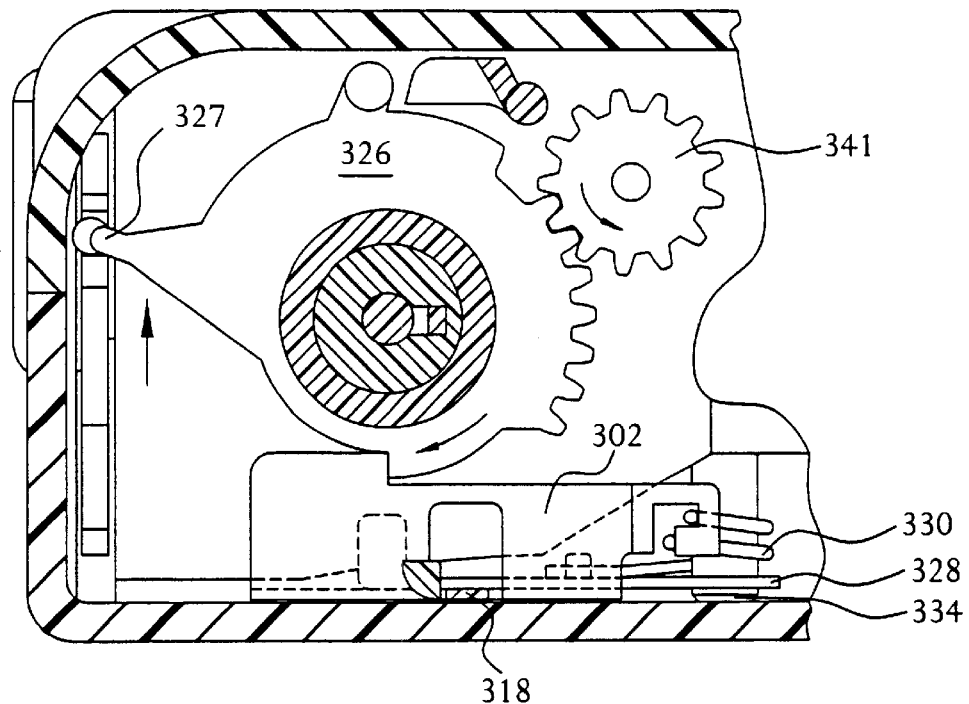
FIG. 17C is a cross section taken along line 17C—17C of FIG. 17B.
Figure 17E:
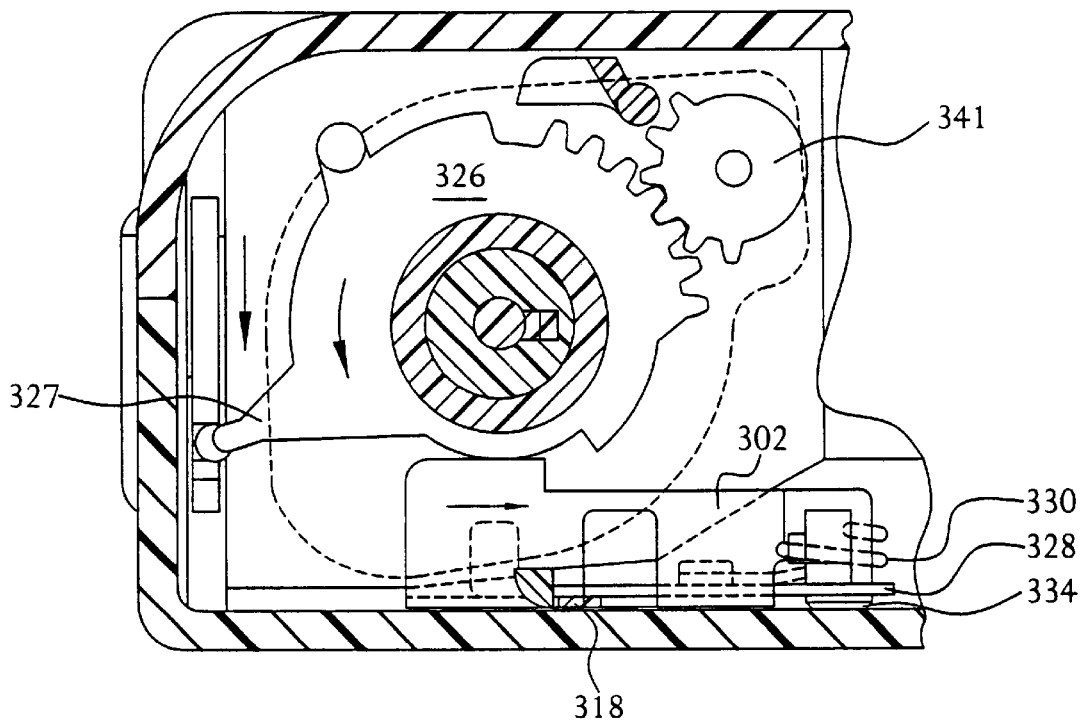
FIG. 17E is a cross section taken along line 17E—17E of FIG. 17D.
Figure 20:
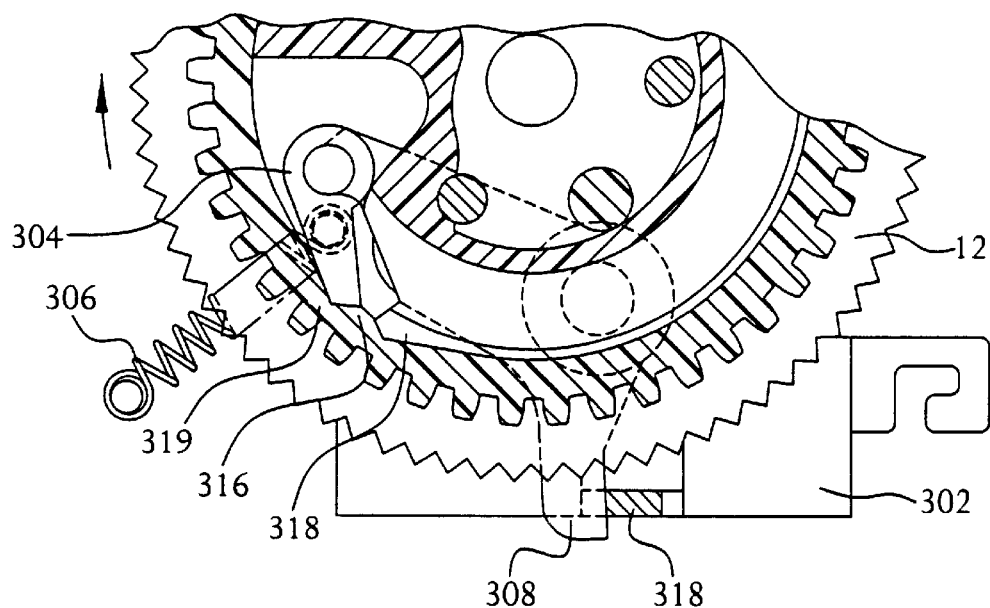
FIG. 20 is a top view of the embodiment of the rewind interlock of FIG. 16 depicting the operation of the rewind interlock when the film is being rewound.

The plate 302, shown in FIGS. 17A, 17C and 17E, is preferably slidably mounted to the camera, as that it can interact with the interlock lever 308. Extending from the plate 302 may be a tab 318 for interfacing with the interlock lever 308, as shown in FIG. 20. The plate 302 may further have a retainer 302a, as shown in FIGS. 17A, 17B and 17D for interfacing with the linkage 328. As is also shown in FIG. 17A, the plate 302 has a hooked end 332 that connects to the spring 330. The linkage 328 is preferably rotatably mounted to the camera by a stem 334. Coupled to the stem 334 is the spring 330. The linkage 328 preferably has a member 328a extending laterally from the linkage for interfacing with the plate 302 and a tab 336 for interfacing with a film cassette 16, as described below. The tab 336 extends into the film cassette compartment through a slot 338 in the camera body.

Figure 20A:
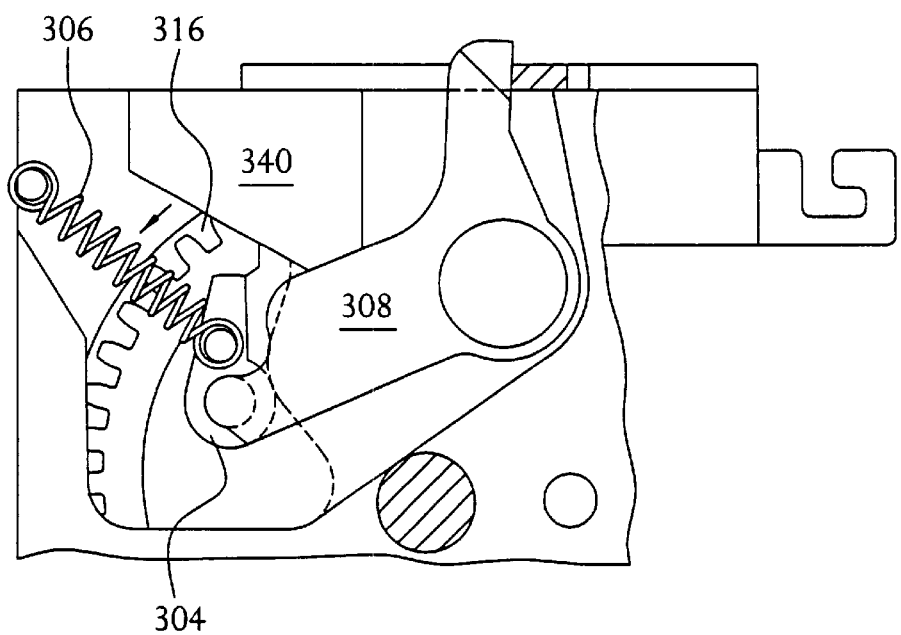
FIG. 20A is a bottom view of the embodiment of the rewind interlock of FIG. 16 depicting the operation of the rewind interlock when the film is being rewound.

A stop 340 may be mounted to the camera to prevent rotation of the interlock lever 308 in the counter clockwise direction. The stop 340 may be defined by a large body of the camera as shown in FIGS. 17 and 20A. Alternatively, the stop may be a separate piece, such as a plate or the like, that is attached to a large part of the camera structure. As explained below, by limiting rotation of the interlock lever, the stop 340 maintains the interlock lever 308 in place during the advancement of film.

As alluded to above, the camera may further have an actuator 324, a door lever 322, a segmented gear 326, the door 339 of the film cassette compartment and a light lock door driver 341. The door lever 322 is coupled to the actuator 324 and the actuator 324 is coupled to the side of the camera, as shown diagrammatically in FIGS. 17A and 17F–17H.

The light lock door driver 341, as shown in FIGS. 17C and 17E, is preferably rotatably mounted to the camera and positioned so that it is engageable with the light lock door of the film cassette 16 when the film cassette 16 is inserted into the film cassette compartment. Rotation of the light lock door driver 341, rotates the light lock door and thereby open and close the light lock door. Such drivers are known in the art. For example, a similar driver is disclosed in commonly assigned U.S. Pat. No. 5,689,733, issued on Nov. 18, 1997, which is hereby incorporated by reference.

The segmented gear 326 is preferably rotatably mounted to the camera above the film cassette compartment, as shown in FIGS. 17A, 17C and 17E. The geared portion of the segmented gear 326 is engageable with the light lock door driver 341, so that the segmented gear 326 can drive the light lock door driver 341 to move the light lock door between the open and closed positions. The segmented gear 326 is not however, coupled to the combined advance/rewind mechanism, so the segmented gear 326 does not move in response to movement of the combined advance/rewind mechanism.

Extending from the periphery of the segmented gear 326 is a finger 327, as shown in FIGS. 17A, 17C and 17E, for engaging the actuator 324. An end of the finger 327 is preferably spherical shaped. As shown in FIGS. 17A and 17F, the actuator 324 is rotatably mounted to the side of the camera and includes a forked end 343. The finger 327 is disposed in the forked end 343 with the spherical end holding the finger 327 within the forked end 343, so that the segmented gear 326 is coupled to the actuator 324. A varity of other fastening techniques may be used to couple the segmented gear 326 to the actuator 324. Preferably, the segmented gear 326 rotates with the movement of the actuator 324.

At the bottom of the camera is the hinged door 339 that covers the film cassette compartment, as shown in FIGS. 17A and FIGS. 17F–17H. Extending from the hinged door 339 may be a tab 345 that engages the actuator 324 to rotate the actuator 324, the segmented gear 326, the light lock door driver 341 and the light lock door, as the hinged door 339 is closed, as shown in FIGS. 17F and 17H, and as explained in detail below. Neither the hinged door 339 nor the actuator 324 themselves are new. For example, they may be found in the Kodak™ ADVANTIX™ Camera manufactured by the assignee of this invention. After a film cassette 16 is inserted into the camera, the hinged door 339 is moved to the closed position, as shown in FIG. 17H. When the hinged door 339 moves to the closed position, the hinged door 339 engages the actuator 324 to drive the actuator 324 to rotate. As the actuator 324 rotates, the segmented gear 326 rotates. The segmented gear 326 drives the light lock door driver 341 to rotate the light lock door of the film cassette 16 to the open position.

The end of the actuator 324 opposite that of the forked end 343 preferably has a first arm 350 and a second arm 352, as shown in FIGS. 17A and 17F–17H. The first arm 350 is preferably biased by a spring 354 that is coupled to the body of the actuator 324 and the first arm 350. The spring 354 preferably biases the first arm 350 to rotate clockwise away from the body of the actuator 324. As is shown in FIG. 17F, the second arm 352 cooperates with the tab extending from the hinged door 339 to hold the hinged door 339 in the closed position.

A door spring 356 is preferably coupled to the camera body and the actuator 324 to bias the actuator 324 to rotate in the clockwise direction, as shown for example in FIGS. 17F–17H. A notch 358 is preferably disposed on the camera, as is also shown in FIGS. 17F–17H. The notch 358 holds the first arm 350 when the actuator 324 is rotated against the bias of the door spring 356 to hold the actuator 324 against the bias of the door spring 356. A door lever 322, as shown in FIGS. 17A, may be disposed on a side of the camera and coupled to the actuator 324. The camera user can push the door lever 322 to rotate the actuator 324 and thereby open the hinged door 339 and shut the light lock door of the film cassette 16. The door lever 322 is interlocked with the hinged door 339 and the light lock door driver 341 to prevent a camera user from opening the hinged door 339 when film extends from the light lock door and thereby prevents unwanted exposure of film. Further operation of the actuator 324, the hinged door 339 and the light lock door driver 341 are described below.

Operation of the Rewind Interlock

Operation of the rewind interlock is best understood with reference to FIGS. 18–24. FIGS. 18, 19, 20,21, 22, 23 and 24 are top views and FIGS. 20A, 21A, 22A and 23A are bottom views depicting the operation of the components of the rewind interlock 300. FIGS. 17D and 17E are top views taken at a lower elevation then those of FIGS. 18 and 19–24 and depict the operation of the linkage and plate 302. FIGS. 17F–17H depict the closing and opening of the hinged door 339 of the film cassette compartment. Operation of the rewind interlock is also best understood beginning with the insertion of a film cassette 16 into the film cassette compartment.

Prior to inserting a film cassette 16 into the film cassette compartment, the hinged door 339, the segmented gear 326, the actuator 324 and the door lever 322 are in the positions shown in FIG. 17G. Further, FIGS. 17B and 17C depicts the linkage 328, as a film cassette 16 is being withdrawn from or inserted into the camera, and alternatively the position of the segmented gear 326 and the plate 302 when the film cassette 16 is being withdrawn from or inserted into the camera and the door 339 is open. FIG. 17D illustrates the linkage 328 after the film cassette 16 has been fully inserted. FIG. 17E illustrates the position of the plate 302 and the segmented gear 326 after the insertion of a film cassette 16 and after closing of the door 339 of the film cassette compartment.

The film loading process begins with inserting a film cassette into the film cassette compartment, as shown in FIG. 17B. It will be appreciated from FIGS. 17A, 18B and 17D that the film cassette 16 contacts the tab 336 upon insertion into the film cassette compartment. Further insertion of the film cassette 16 pushes the tab 336 and causes the linkage 328 to rotate clockwise, as viewed in FIG. 17B, about the stem 334. As the linkage 328 rotates, the spring 330 is compressed because one end of the spring 330 is coupled to the plate 302 and the other end is coupled to the linkage 328, as best understood with reference to FIGS.

17A, 17C and 17D. As the spring 330 is compressed, the spring 330 exerts a force on the plate 302 that urges the plate 302 to move to the right, as best understood with reference to FIGS. 17B and 17E. Further insertion of the film cassette, rotates the linkage 328 to the position shown in FIG. 17D.

At this point in the film loading process, the film cassette is inserted and the door 339 is still open. Since the door 339 is still open, the segmented gear 326 is in the position shown in FIG. 17C after insertion of the film cassette 16. In this position, the plate 302 is urged to move to the right, as shown in FIG. 17E, and the plate, urged by the spring 330, pushes on the segmented gear 326 which is in the position of FIG. 17C, but the segmented gear 326 cannot rotate because the force exerted by the plate 302 is not sufficient to overcome the force needed to rotate the segmented gear 326 and the actuator 324, which is prevented from rotating by the notch 345 shown in FIG. 17F, coupled to the segmented gear 326. The plate 302 cannot move to the right until the segmented gear 326 is rotated due to the closing of the hinged door 339, as described below.

As the film cassette 16 is inserted into the camera, the light lock door becomes coupled to the light lock door driver 341. In order to light seal the film cassette 16 within the film cassette compartment, the hinged door 339 is moved, as shown in FIG. 17H, from the open position of FIG. 17G to the closed position of FIG. 17F. As the hinged door 339 is closed, the tab 345 of the hinged door 339 engages the actuator 324 to cause the actuator 324 to push the first arm 350 of the actuator 324 against the bias of the spring 356, as shown in FIG. 17H. Once the tab pushes the first arm 350 above the notch 358, the actuator 324 rotates clockwise due to the door spring 356 to the position shown in FIG. 17F. As the actuator 324 rotates, the second arm 352 engages the tab and rests underneath the tab 345 to prevent opening of the hinged door 339 unless the actuator 324 is rotated. Further, once the actuator 324 rotates, the first arm 350 is pushed by the spring 354 to rest against the notch 358, as shown in FIG. 17F.

Because the segmented gear 326 is coupled to the actuator 324, rotation of the actuator 324 upon the closing of the hinged door 339 rotates the segmented gear 326 in the counter clockwise direction, as shown in FIG. 17E, and as is also illustrated by comparing FIGS. 17H and 17F. This rotation of the segmented gear 326 releases the plate 302, so that the plate 302, due to the urging of the spring 330, moves to the right, as shown in FIG. 17E. Rotation of the segmented gear 326 upon closing the hinged door 339 also rotates the light lock door driver 341 to open the light lock door of the film cassette 16, which is best understood by comparing FIGS. 17C and 17E.

As the film cassette 16 is being inserted and the linkage 328 is rotating, the member 328a is positioned to the right side of the retainer 302a defined by the plate 302, as shown in FIG. 17B. When the plate 302 moves to the right, as described above when the door 339 is closed, the left side of the retainer 302a captures the member 328a to hold the member 328a and the linkage 328, as shown in FIG. 17D. Movement of the plate 302 to the right, also releases the interlock lever 308 to rotate in the counter clockwise direction due to the biasing of the spring 306. As shown in FIG. 18, in this position the end of the pawl 304 rests against the inner periphery of the combined advance/rewind mechanism and the interlock lever rests against the tab 318.

With the components in the position illustrated in FIG. 18, which may be referred to as the first position, the combined advance/rewind mechanism may be rotated continuously or intermittently in the counter clockwise or advance direction to advance the film from the film cassette to the film exposing area, and the film from the film exposing area to the film spool. This is best illustrated with reference to FIG. 19. As shown, when the combined advance/rewind mechanism is rotated the notch 316 will contact the end of the pawl 304. Upon contacting the end of the pawl 304, the notch 316 pushes the pawl 304 to rotate the pawl 304 counter clockwise against the bias of the spring 306 until the notch 316 passes by the pawl 304. The interlock lever 308 does not rotate because it is prevented from rotation by the stop 340, as best understood with reference to FIGS. 17 and 20A. Continuation rotation of the advance/rewind mechanism moves the notch 316 past the pawl 304 and the pawl 304 is released. When released the spring 306 biases the pawl 304 to rotate clockwise so that it again rests against the inner periphery of the combined advance/rewind mechanism, as shown in FIGS. 20 and 20A.

Figure 19:
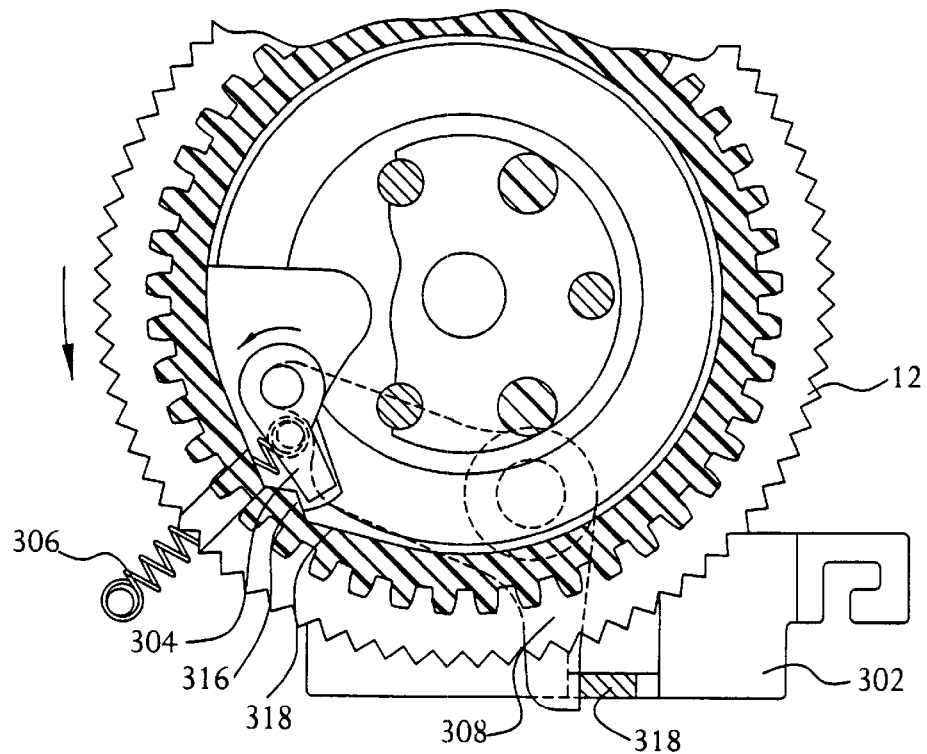
FIG. 19 is a top view of the embodiment of the rewind interlock of FIG. 16 depicting the operation of the rewind interlock when the film is being advanced.

The stop 340 shown in FIGS. 17 and 20A prevents any significant degree of rotation of the interlock lever 308 in the clockwise direction, as the pawl 304 is being rotated counter clockwise, as viewed in FIGS. 18 and 19. Therefore, the interlock lever 308 remains relatively stationary as the film is advanced. This is best understood with reference to FIG. 20A, which is a bottom view showing the interlock lever 308 resting against the stop 340. Thus, with the pawl 304 and the rewind interlock 308 in their first position, the combined advance/rewind mechanism is free to rotate in the advance direction, so that the leading edge of the film can be advanced to the film spool and the film can be advanced to the film spool after each frame of film is successively exposed in the film exposing area.

Figure 21:
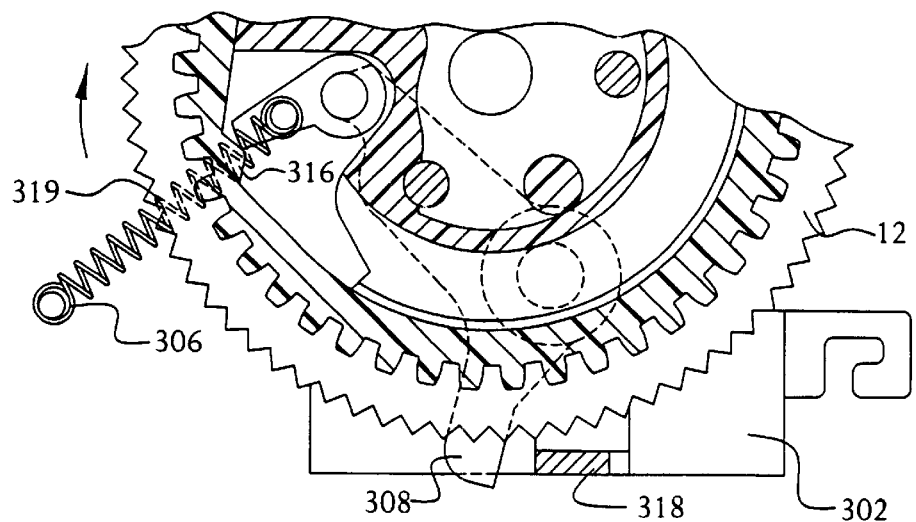
FIG. 21 is another top view of the embodiment of the rewind interlock of FIG. 16 depicting the operation of the rewind interlock when the film is being rewound.
Figure 21A:
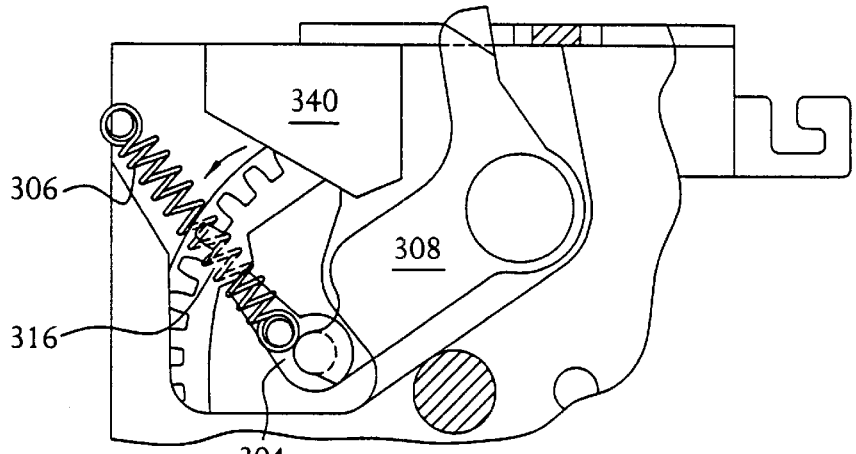
FIG. 21A is another bottom view of the embodiment of the rewind interlock of FIG. 16 depicting the operation of the rewind interlock when the film is being rewound.

Typically, after all of the exposures have been taken, the film is rewound into the film cassette 16. The rewind interlock prevents attempting to advance the film after the film has been rewound into the cassette. This prevents exposed film from being exposed again. Similarly, if exposed film is rewound before all of the film has been exposed, the rewind interlock will prevent advancing the film and the creation of a double exposure. This prevents the accidental loss of an exposure. Moreover, if the camera is of the type where the film is loaded onto the film spool prior to exposing the film and each exposed frame is moved into the film cassette after it has been exposed, the rewind interlock prevents moving the exposed film out of the film cassette and into the film exposing area The rewind interlock does this as shown in FIGS. 20–23. As shown in FIGS. 20 and 21, the combined advance/rewind mechanism is rotated in the clockwise direction in order to rewind the film. Eventually, the notch 316 engages the angled end 319 of the pawl 304, as shown in FIGS. 20 and 20A. Continued rotation of the combined advance/rewind mechanism pushes the pawl 304 to rotate clockwise about the stem and the interlock lever 308 to rotate clockwise about the rivet against the bias of the spring 306, as shown in FIGS. 21 and 21A. The pawl 304 rotates with the interlock lever 308 and rides along the stop, as shown in FIG. 21. The interlock lever 308 rotates away from the stop 340. As the combined advance rewind mechanism is being rotated, film is being moved from the film exposing area and the film spool back to the film cassette.

Figure 22:
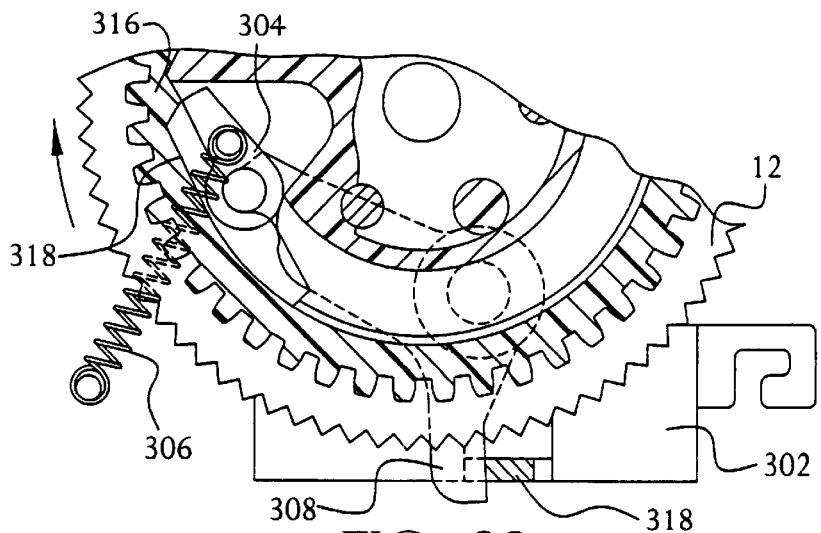
FIG. 22 is another top view of the embodiment of the rewind interlock of FIG. 16 depicting the operation of the rewind interlock when the film is being rewound.
Figure 22A:
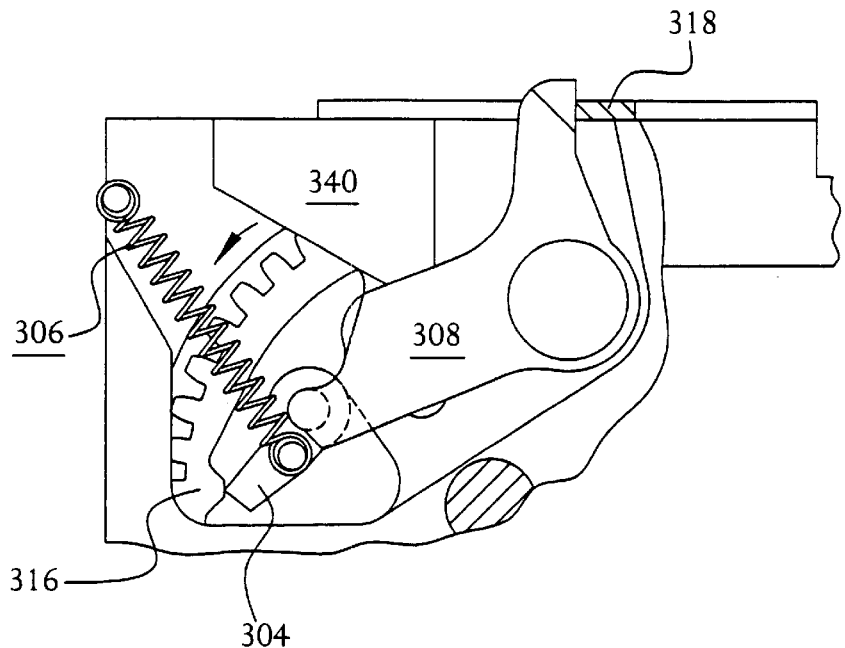
FIG. 22A is another bottom view of the embodiment of the rewind interlock of FIG. 16 depicting the operation of the rewind interlock when the film is being rewound.
Figure 23:
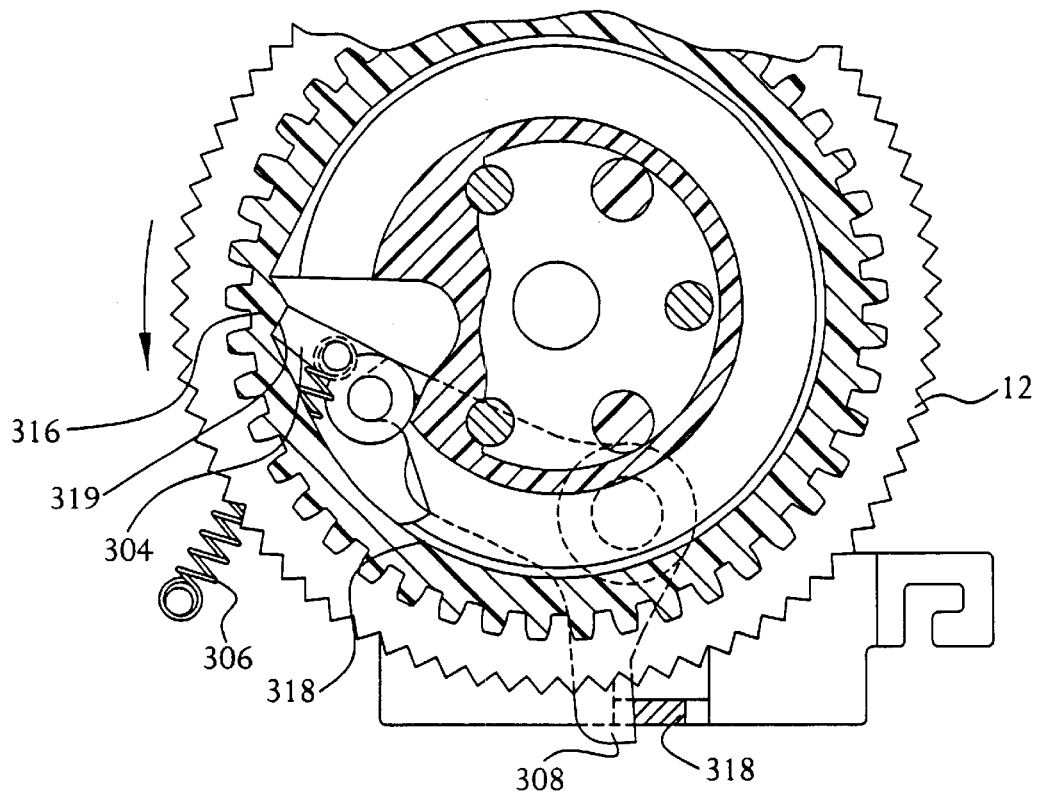
FIG. 23 is a top view of the embodiment of the rewind interlock of FIG. 16 when the rewind interlock is in a second position.

As shown in FIGS. 22 and 23, continued rotation of the combined advance/rewind mechanism moves the notch 316 past the pawl 304 and releases the pawl 304 and the interlock lever 308. The spring 306 biases the pawl 304 to rotate against the inner periphery of the combined advance/rewind mechanism, and the interlock lever 308 to rotate counterclockwise as shown in FIGS. 22 and 22A. The interlock lever 308 rotates clockwise, as viewed in FIG. 22A, until the interlock lever 308 contacts the stop 340.

In this position or second position, the pawl 304 is disposed so that the angled end 319 of the pawl 304 is in a different position relative to the notch 316. In the first position, the angled end 319 was not contacted by the combined advance/rewind mechanism when this mechanism was rotated in the clockwise or advance direction, as shown in FIG. 19. However, when the pawl 304 is in the second position, the angled end 319 will be contacted by the notch 316, as the combined advance/rewind mechanism rotates in the advance direction.

Figure 23A:
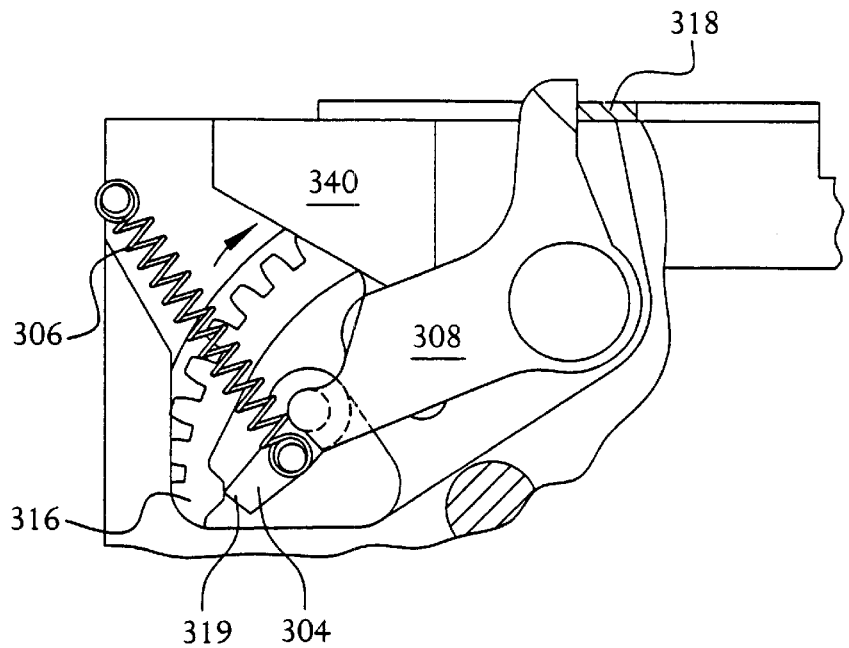
FIG. 23A is a bottom view of the embodiment of the rewind interlock of FIG. 16 when the rewind interlock is in a second position.

After the notch 316 releases the pawl 304, the rewind interlock is established. This is best understood with reference to FIGS. 23 and 23A. If an attempt is made to advance the film after the interlock is set, the notch 316 will engage the angled end 319 of the pawl 304 to try to rotate the pawl 304 and the interlock lever 308 in the counter clockwise direction, as viewed in FIG. 23 (counterclockwise as viewed in FIG. 23A). In this position, the interlock lever 308 will rest against the stop 340 shown in FIG. 23A. Due to an angled portion of the notch 316 engaging a corresponding angled end 319 of the pawl 304, as shown in FIGS. 23 and 23A, rotation of the both the pawl 304 and the interlock lever 308. Thus, the film cannot be advanced after it has been rewound.

As alluded to above, the rewind interlock of this invention may be employed with a variety of film advancing or rewinding mechanisms and is not limited to the combined advancing/rewind mechanism. Rather, the rewind interlock can be practiced with a wheel that has a notch disposed along its inner periphery and that rotates as film is moved within the camera.

It will be appreciated that the combined advance/rewind mechanism may be rotated to a certain extent in the rewind direction before the interlock is set. This depends on the location of the notch relative to the pawl before the rewind motion is initiated. In order to prevent rewinding of the film, the gear train can be designed so that there is enough slack in it to prevent the film from being rewound to any significant degree before the interlock is set. Alternatively, a plurality of notches may be disposed along the inner periphery of the combined advance/rewind mechanism.

In order to reset the rewind interlock so that film can be advanced from a film cassette, the film cassette 16 is removed from the camera. This occurs as follows. The door lever 322 of FIG. 17A is rotated by a camera user to open the hinged door 339 as follows. Since the actuator 324 is coupled to the door lever 322, the actuator 324 rotates with the door lever 322. As shown by comparing FIGS. 17F and 17G, the rotation of the actuator 324 counter clockwise against the bias of the door spring 356, causes the first arm 350 to slide along the notch 358 and the second arm 352 to move away from the tab of the hinged door 339. Eventually, the second arm 352 becomes disengaged from the tab, and the hinged door 339 is free to open. Further, the first arm 352 also rotates past the notch 358 and the spring 354 biases the first arm 352 to move to engage the notch 358, as shown in FIG. 17G. With the hinged door 339 opened, the film cassette can be removed.

Because the segmented gear 326 is coupled to the actuator 324, the segmented gear 326 rotates, as shown in FIGS. 17F and 17G, as the actuator 324 rotates with the door lever 322. This is also shown in FIG. 17C, which depicts the segmented gear 326 rotating in the clockwise direction, as the door 339 is being opened. Opening of the door 339 permits withdraw of the film cassette 16 from the film cassette compartment. As the segmented gear 326 rotates in the clockwise direction, the segmented gear 326 engages the plate 302 and pushes the plate 302 to the left against the bias of the spring 330 as shown in FIG. 17C.

Figure 24:
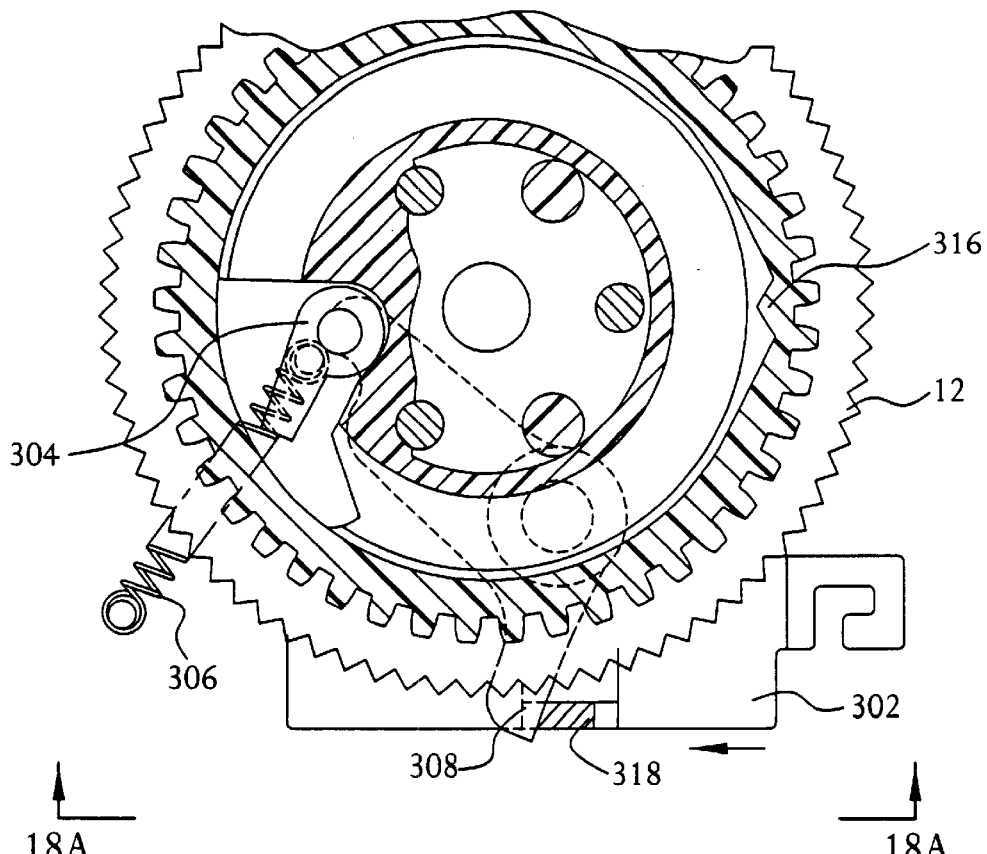
FIG. 24 illustrates the resetting of the rewind interlock of FIG. 16 so that film can be advanced.

Upon moving to the left, the tab 318 of the plate 302 engages the interlock lever 308 to rotate the interlock lever 308 in the clockwise direction as shown in FIG. 24. As the interlock lever 308 rotates clockwise, the pawl 304 rotates with the interlock lever 308 and no longer rests against the inner periphery of the combined rewind/advance mechanism. This releases the pawl 304. Once released, the spring 306 causes the pawl 304 to rotate clockwise relative to the interlock lever 308, as best understood by comparing FIGS. 23 and 24. The pawl 304 and the interlock lever 308 have been reset because the pawl 304 has rotated relative to the notch 316, so that the angled end 319 of the pawl 304 will not engage the notch 316 as the advance/rewind mechanism is rotated in the advance direction to prevent rotation of the advance/rewind mechanism.

FIG. 17B illustrates the plate 302 and the linkage 328, as the film cassette 16 is being removed from the film cassette compartment. As described above, opening of the door 339 causes the plate 302 to slide to the left, as shown in FIGS. 17C and 24, against the bias of the spring 330. As the plate 302 moves to the left, the member 328a of the linkage 328 is release from the retainer 302a of the plate 302, as is best understood with reference to FIG. 17B. Once released, the spring 330 causes the linkage 328 to rotate counter clockwise, as shown in FIG. 17B. In this position, the camera is ready for insertion of another film cassette.

If desired a film cassette can be inserted into the film cassette compartment and the hinged door 339 can be closed. Closing of the hinged door moves the pawl 304 and the interlock lever 308 back to the position of FIG. 18. This occurs because the closing of the hinged door moves the slide 302 to the right, which releases the interlock lever 308. Once released the interlock lever 308 rotates counter clockwise from the position of FIG. 24 to the position of FIG. 18. The pawl 304 rotates with the interlock lever 308, so that the pawl 304 rests against the inner periphery again. Now, the pawl 304 and the interlock lever 308 are back in their first position. That is the pawl 304 has rotated relative to the notch 316, so that the angled end of the pawl 304 will not engage the pawl 304 as the advance/rewind mechanism is rotated in the advance direction.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the fill extent indicated by the broad general meaning of the terms in which the appended claims are expressed.

What is claimed is:

1. A camera that has a film cassette compartment for receiving a film cassette that has a light lock door and that has a film path defined between the film cassette compartment and a film spool, comprising:

a rotatable wheel, rotatably mounted to the camera, that moves film from the film cassette into the film path and around the film spool when the wheel is rotated in a first direction and that moves film from the film spool into the film path and into the film cassette when the wheel is rotated in a second direction;

a rewind crank, rotatably mounted to the camera and coupled to the wheel, that has a first position and a second position; and an interlock, coupled to the rewind crank, the interlock being engageable and disengageable with the wheel and being responsive to movement of the rewind crank between the first position and the second position, to engage the wheel to prevent rotation of the wheel in the first direction when the rewind crank is in the second position, and to engage the wheel to prevent rotation of the wheel in the second direction when the rewind crank is in the first position.

2. The camera of claim 1, wherein the interlock comprises (i) a stationary support that is rigidly attached to the camera and that has a periphery and a plurality of teeth disposed about the periphery and (ii) a spring mechanism, mounted on the rotatable wheel, that is responsive to movement of the rewind crank between the first position and the second position and that has a first member that is engageable with the teeth of the stationary support to prevent rotation of the rotatable wheel in the second direction when the rewind crank is in the first position and a second member that is engageable with the teeth of the stationary support to prevent rotation of the rotatable wheel in the second direction when the rewind crank is in the first position.

3. The camera of claim 2, wherein the interlock further comprises a slidable plate, coupled to the wheel, that moves in response to movement of the rewind crank between a first location in which it holds the first member engaged with the teeth of the stationary support and a second location in which it holds the second member engaged with the teeth of the stationary support.

4. The camera of claim 1, further comprising a gear train, disposed between the film cassette compartment and the film spool, that couples the rotatable wheel to the film spool, so that the film spool can rotate in response to rotation of the rotatable wheel in the first direction.

5. The camera of claim 1, further comprising a shaft, coupled to the rotatable wheel and to a spindle of the film cassette, so that rotation of the rotatable wheel in the first direction rotates the spindle to thrust film from the film cassette.

6. The camera of claim 1, further comprising a gear train, disposed between the film cassette compartment and the film spool, that couples the rotatable wheel to the film cassette to thrust film out of the film cassette when the rotatable wheel is rotated in the first direction.

7. The camera of claim 6, wherein the gear train couples the rotatable wheel to the film spool to rotate the film spool and pull film from the film cassette when the rotatable wheel is rotated in the first direction.

8. The camera of claim 7, wherein the gear train comprises a pivotably mounted gear that is pivotably mounted to the camera and that pivots in response to rotation of the wheel in the second direction to decouple the wheel from the film spool.

9. The camera of claim 1, wherein the rotatable wheel comprises a segmented portion that can be engaged by a camera user to rotate the wheel.

10. A manual camera of the type that can receive a film cassette, that has a light lock door and a spindle around which film is wound, into a film cassette compartment and that has a film path, defined between the film cassette compartment and a film spool, comprising:

a combined film advance and rewind mechanism, comprising:

(i) a wheel rotatably mounted to the camera that has a segmented portion that can be engaged by a camera user to rotate the wheel, the wheel being coupled to the spindle to thrust film from the film cassette into the film path and around the film spool when the wheel is rotated in a first direction and being coupled to the spindle to move film from the film spool into the film path and into the film cassette when the wheel is rotated in a second direction;

(ii) a rewind crank, rotatably mounted to the camera and coupled to the wheel, that has a first position and a second position;

(iii) an interlock, coupled to the rewind crank, the interlock being engageable and disengageable with the wheel and being responsive to movement of the rewind crank between the first position and the second position, to engage the wheel to prevent rotation of the wheel in the first direction when the rewind crank is in the second position, and to engage the wheel to prevent rotation of the wheel in the second direction when the rewind crank is in the first position; and a gear train, coupled to the wheel and disposed between the film cassette compartment and the film spool, the gear train being selectively engageable with the film spool, so that the gear train can rotate the film spool in response to rotation of the wheel in the first direction to wind film around the film spool, and the gear train being engageable with the spindle of the film cassette, so that the gear train can advance film from the film cassette by thrusting film from the film cassette when the wheel is rotated in the first direction and rewind film into the film cassette when the wheel is rotated in the second direction.

11. The manual camera of claim 10, wherein the interlock comprises (i) a stationary support that is rigidly attached to the camera and that has a periphery and a plurality of teeth disposed about the periphery and (ii) a spring mechanism, mounted on the rotatable wheel, that is responsive to movement of the rewind crank between the first position and the second position and that has a first member that is engageable with the teeth of the stationary support to prevent rotation of the rotatable wheel in the second direction when the rewind crank is in the first position and a second member that is engageable with the teeth of the stationary support to prevent rotation of the rotatable wheel in the second direction when the rewind crank is in the first position.

12. The manual camera of claim 11, wherein the interlock further comprises a slidable plate, coupled to the wheel, that moves in response to movement of the rewind crank between a first location in which it holds the first member engaged with the teeth of the stationary support and a second location in which it holds the second member engaged with the teeth of the stationary support.

13. The manual camera of claim 10, wherein the gear train comprises a gear that is pivotably mounted to the camera and that is operative to pivot in response to rotation of the wheel in the first direction to engage the gear train with the film spool, so that the film spool can rotate in response to rotation of the wheel, and that is operative to pivot in response to rotation of the wheel in the second direction to disengage the gear train from the film spool, so that the film spool does not rotate in response to rotation of the wheel in the second direction.

14. A camera that has a film cassette compartment for receiving a film cassette that has a light lock door and that has a film path defined between the film cassette compartment and a film spool, comprising:

a combined film advance and rewind mechanism, comprising:

(a) a rotatable wheel, rotatably mounted to the camera, that moves film from the film cassette into the film path and around the film spool when the wheel is rotated in a first direction and that moves film from the film spool into the film path and into the film cassette when the wheel is rotated in a second direction;

(b) a rewind crank, rotatably mounted to the camera and coupled to the wheel, that has a first position and a second position; and (c) an interlock, coupled to the rewind crank, that prevents movement of the wheel in either the first direction or the second direction, comprising:

($c_1$) a stationary support that is rigidly mounted to the camera and that has a periphery and a plurality of teeth disposed about the periphery;

($c_2$) a spring mechanism, mounted to the rotatable wheel, so that the spring mechanism rotates with the wheel, the spring mechanism comprising a first member that is operative to engage the teeth to prevent movement of the wheel in the second direction and a second member that is operative to engage the teeth to prevent movement of the wheel in the first direction;

($c_3$) a plate, that is slidably mounted to the camera and that is coupled to the rewind crank, the plate being operative to slide to a first location in response to movement of the rewind crank to the first position, the plate holding the first member out of engagement with the teeth of the stationary support against the pressure of the spring mechanism to permit movement of the wheel in the first direction, and permitting the second member to engage the teeth to prevent movement of the wheel in the second direction, when the plate is in the first location, and the plate holding the second member out of engagement with the teeth of the stationary support against the pressure of the spring mechanism to permit movement of the wheel in the second direction, and permitting the first member to engage the teeth to prevent movement of the wheel in the first direction, when the plate is in the second location.

15. The camera of claim 14, further comprising a gear train, disposed between the film cassette compartment and the film spool, that couples the rotatable wheel to the film spool, so that the film spool can rotate in response to rotation of the rotatable wheel in the first direction.

16. The camera of claim 15, further comprising a gear train, disposed between the film cassette compartment and the film spool, that couples the rotatable wheel to a spindle of the film cassette to thrust film out of the film cassette when the rotatable wheel is rotated in the first direction.

17. The camera of claim 16, wherein the gear train couples the rotatable wheel to the film spool to rotate the film spool and pull film from the film cassette when the rotatable wheel is rotated in the first direction.

18. The camera of claim 17, wherein the gear train decouples the rotatable wheel from the film spool and couples the rotatable wheel to the film cassette when the rotatable wheel is rotated in the second direction to wind film into the film cassette.

19. The camera of claim 18, wherein the gear train comprises a pivotably mounted gear that is pivotably mounted to the camera and that pivots in response to rotation of the wheel in the second direction to decouple the wheel from the film spool.

20. A manual camera of the type that can receive a film cassette that has a light lock door and that has a spindle around which film can be wound into a film cassette compartment and that has a film path defined between the film cassette compartment and a film spool, comprising:

a wheel, rotatably mounted to the camera, and having a segmented portion for engagement by a camera user to rotate the wheel;

a gear train, disposed between the film cassette compartment and the film spool and being coupled to the wheel, the gear train being operative to couple the wheel to the spindle of the film cassette and to the film spool to rotate the spindle in response to rotation of the wheel in a first direction and thereby rotate the spindle to thrust film out of the film cassette and rotate the film spool to wind film around the film spool and to couple the wheel to the spindle and not the film spool when the wheel is rotated in a second direction, so that the wheel drives the spindle to rotate, but not the film spool, and thereby wind the film into the film cassette; and a rewind crank, rotatably mounted to the camera and coupled to the wheel, and an interlock, coupled to the wheel and the crank, the interlock being operative to engage the wheel to prevent rotation of the wheel in the second direction in response to movement of the rewind crank to a first position and being operative to engage the wheel to prevent rotation of the wheel in the first direction in response to movement of the rewind crank to a second position.

21. The camera of claim 20, wherein the gear train comprises a pivotably mounted gear that is pivotably mounted to the camera and that pivots in response to rotation of the wheel in the second direction to decouple the wheel from the film spool.

22. A manual camera of the type that has a film cassette compartment into which a film cassette that has a spindle around which film is wound can be inserted, comprising:

a film spool around which film can be wound;

a film path disposed between the film cassette compartment and the film spool;

a film advance mechanism mounted to the camera;

a gear train, disposed in the camera comprising a first pivotably mounted gear that selectively couples the film advance mechanism to the film spindle, such that manipulation of the film advance direction drives the first pivotably mounted gear, so that the film spindle rotates and film is thrust from the film cassette and continued manipulation of the film advance mechanism after the film is thrust across the film path and around the film spool pivots the first pivotably mounted gear to disconnect the film advance mechanism from the film spindle; and a second pivotally mounted gear that selectively couples the film advance mechanism to the film spool such that manipulation of the film advance mechanism in the film advance direction drives the second pivotably mounted gear and the film spool to rotate and manipulation of the film advance mechanism in a rewind direction pivots the second pivotably mounted gear to disconnect the film advance mechanism from the film spool.

23. The camera of claim 22, wherein the film advance mechanism comprises a rotatable wheel and a lever which can be engaged by a camera user.

24. The camera of claim 22, further comprising a third pivotably mounted gear that selectively couples the film advance mechanism to the film spindle, such that manipulation of the film advance mechanism in a rewind direction pivots the third pivotably mounted gear to couple the film advance mechanism to the film spindle and further rotation of the film advance mechanism in the rewind direction drives the third pivotably mounted gear to rotate, so that the film spindle rotates and film is pulled from the film spool to the film cassette and wound around the film spindle.

25. A method of loading film in a manual camera of the type that has a film spool, a film cassette compartment into which a film cassette that has a spindle around which film is wound can be inserted and a film path disposed between the film spool and the film cassette compartment, comprising:

manipulating a film advancing mechanism in a first direction to drive a gear train which is coupled to the film spindle and the film spool and thereby thrust film from the film cassette along the film path and around the film spool;

further manipulating the film advancing mechanism in a first direction and thereby (i) pivoting a first pivotably mounted gear of the gear train so that the film advancing mechanism is not coupled to the film spindle and (ii) rotating the film spool to wind film around the film spool; and further manipulating the film advancing mechanism in a second direction and thereby pivoting a second pivotably mounted gear of the gear train so that the film advancing mechanism is not coupled to the film spool.

26. The method of claim 25, further comprising inserting a film cassette into the film cassette compartment.

27. The method of claim 25, further comprising manipulating the film advancing mechanism in the first direction and thereby opening a light lock door of the film cassette.

28. The method of claim 25, further comprising manipulating the film advancing mechanism in the second direction and thereby closing a light lock door of the film cassette.

29. The method of claim 25, further comprising manipulating the film advancing mechanism in the second direction and thereby pivoting a third pivotably mounted gear to couple the film advance mechanism to the film spindle.

30. The method of claim 29, further comprising further manipulating the film advancing mechanism in the second direction and thereby rotating the third pivotably mounted gear, so that the film spindle rotates and film is pulled from the film spool to the film cassette and wound around the film spindle.

* * * * *

UNITED STATES PATENT AND TRADEMARK OFFICE
CERTIFICATE OF CORRECTION

PATENT NO. : 6,331,082 B1
DATED : December 18, 2001
INVENTOR(S) : Bittner

It is certified that error appears in the above-identified patent and that said Letters Patent is hereby corrected as shown below:

Column 6,
Line 13, please delete "glide" and insert therefor -- slide --;

Column 22,
Line 50, please delete "as" and insert therefor -- so --;

Column 28,
Line 54, please delete "fill" and insert therefor -- full --;

Column 32,
Line 46, before the word "advance" please insert -- advance mechanism in an --.

Signed and Sealed this

First Day of July, 2003

JAMES E. ROGAN
*Director of the United States Patent and Trademark Office*